(12) United States Patent
Kandanala et al.

(10) Patent No.: US 8,626,587 B2
(45) Date of Patent: Jan. 7, 2014

(54) ARTIFICIAL INTELLIGENCE-BASED RECOMMENDER AND SELF-PROVISIONER

(75) Inventors: Venket S. Kandanala, Highland Village, TX (US); Karthik Srinivasan, Flower Mound, TX (US); Nicky Pinakin Joshi, Flower Mound, TX (US); Varughese P. Mathew, Lewisville, TX (US); Anand N. Sankaran, MGR Nagar (IN); Siddhartha X. Gunda, Satavahana Nagar (IN); Pankul X. Mahajan, Kathua (IN); Jubish C. Parambath, Baliah Garden (IN); Paranjothi X. Ramalingam, Maruthi Nagar (IN); Lisa A. Caputo, Dade City, FL (US); Sundarajan Varadharajan, Zamin Pallavaram (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 403 days.

(21) Appl. No.: 12/965,149

(22) Filed: Dec. 10, 2010

(65) Prior Publication Data

US 2012/0150642 A1    Jun. 14, 2012

(51) Int. Cl.
 *G06Q 30/00*    (2012.01)
(52) U.S. Cl.
 USPC .................. 705/14.53; 705/14.49; 705/14.66; 705/14.67
(58) Field of Classification Search
 CPC .......... G06Q 30/0251; G06Q 30/0255; G06Q 30/0269; G06Q 30/0271
 USPC ...................... 705/14.49, 14.53, 14.66, 14.67
 See application file for complete search history.

(56) References Cited

U.S. PATENT DOCUMENTS

| | | | |
|---|---|---|---|
| 2005/0204381 A1* | 9/2005 | Ludvig et al. ................... | 725/34 |
| 2007/0234382 A1* | 10/2007 | Swix et al. ...................... | 725/34 |
| 2009/0216847 A1* | 8/2009 | Krishnaswamy et al. .... | 709/206 |
| 2009/0217319 A1* | 8/2009 | Weiss .............................. | 725/34 |
| 2009/0234717 A1* | 9/2009 | Wiggins et al. ................. | 705/10 |
| 2009/0300675 A1* | 12/2009 | Shkedi ............................ | 725/34 |
| 2010/0146607 A1* | 6/2010 | Piepenbrink et al. ............. | 726/7 |
| 2010/0319013 A1* | 12/2010 | Knudson et al. ................ | 725/14 |
| 2011/0252226 A1* | 10/2011 | Francis et al. ................ | 713/150 |
| 2012/0323685 A1* | 12/2012 | Ullah ......................... | 705/14.53 |

* cited by examiner

*Primary Examiner* — Raquel Alvarez

(57) ABSTRACT

A method including providing at least one of a phone service, an Internet access service, or a television service to customers; identifying a customer when the customer uses the at least one of the phone service, the Internet access service, or the television service; selecting products or services for which the customer qualifies based on the identifying; gathering customer-specific data for the customer; generating recommendations that pertain to the at least one of the phone service, the Internet access service, or the television service for the customer based on the products or the services for which the customer qualifies, the customer-specific data, and other factors, wherein the other factors include at least one of a location of the customer or a time in which the recommendations is to be provided to the customer; and providing the recommendations to the customer via the at least service.

20 Claims, 20 Drawing Sheets

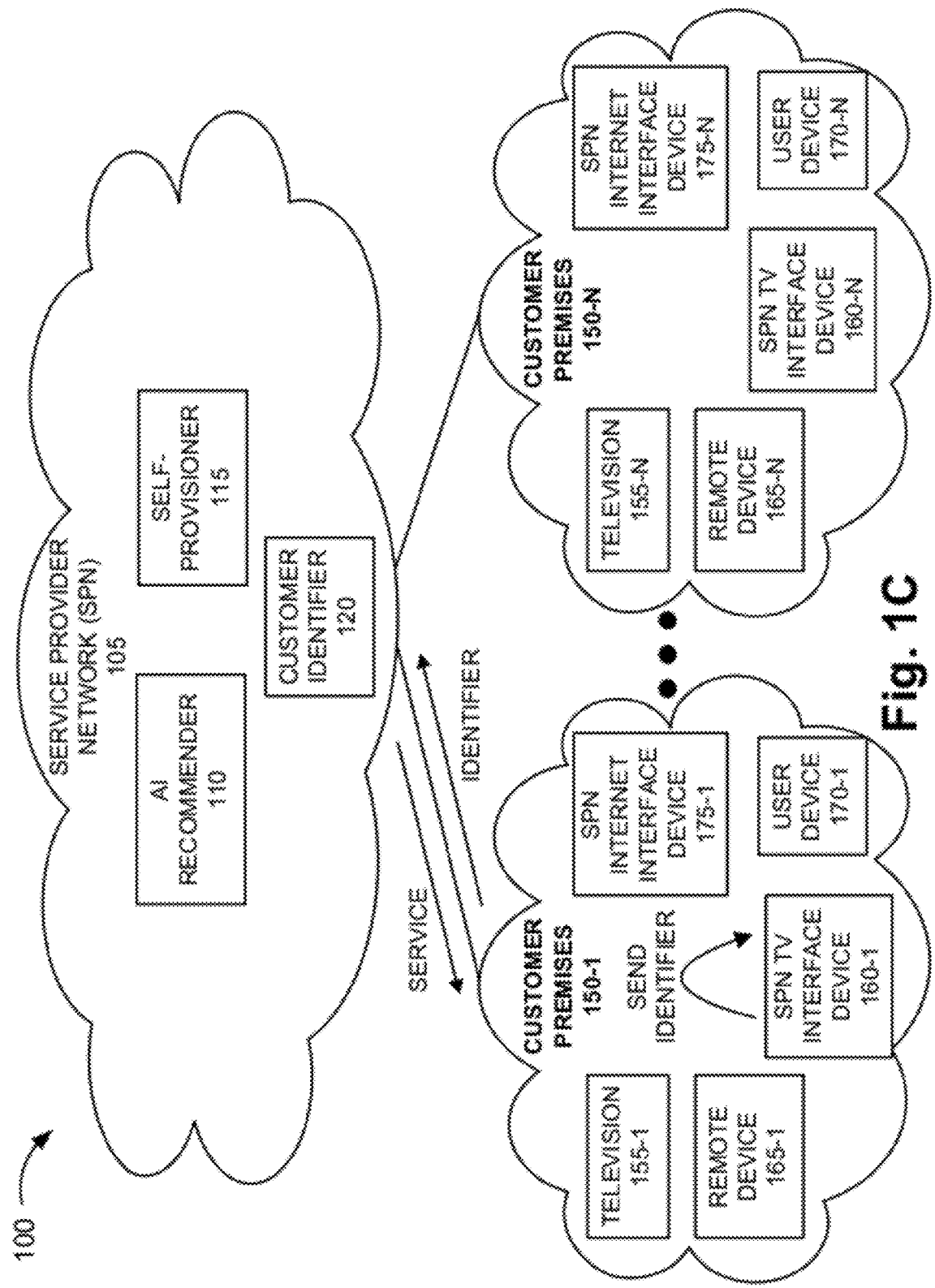

US 8,626,587 B2

ARTIFICIAL INTELLIGENCE-BASED RECOMMENDER AND SELF-PROVISIONER

BACKGROUND

Service providers (SPs) are continually trying to improve customer relationship management (CRM) systems. CRM systems may enhance the quality of service provided by service providers as well as improve customer experience and satisfaction.

BRIEF DESCRIPTION OF THE DRAWINGS

FIGS. 1B-1J are diagrams illustrating an exemplary process associated with an exemplary embodiment of an AI-based recommender and an exemplary embodiment of a self-provisioner;

DETAILED DESCRIPTION OF PREFERRED EMBODIMENTS

Figure 1A:
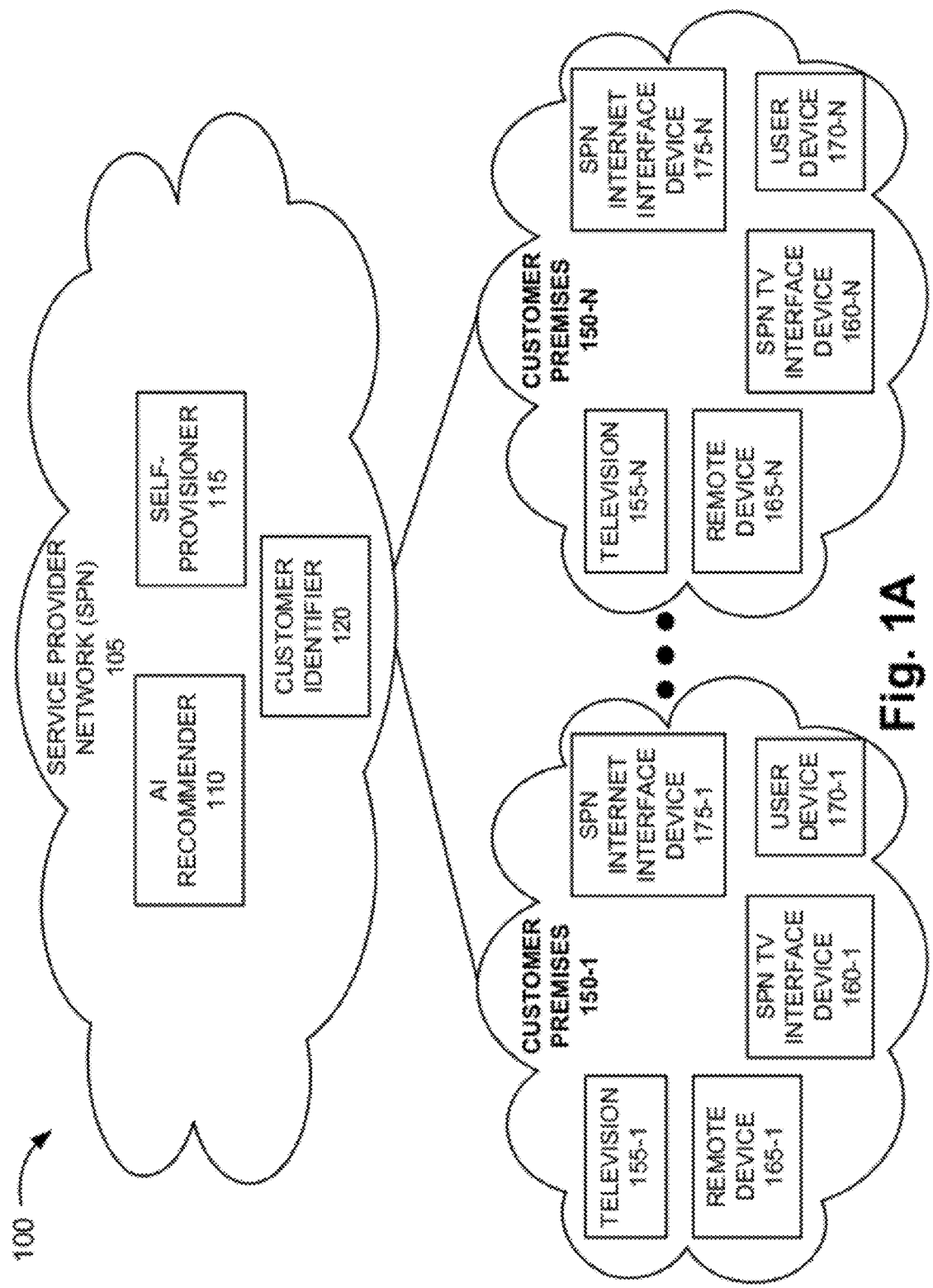
FIG. 1A is a diagram illustrating an exemplary environment in which an exemplary embodiment of an artificial intelligence (AI)-based recommender and an exemplary embodiment of a self-provisioner may be implemented.

The following detailed description refers to the accompanying drawings. The same reference numbers in different drawings may identify the same or similar elements. Also, the following detailed description does not limit the invention.

The term "content," as used herein, is intended to be broadly interpreted to include, for example, visual data, audio data, a combination of audio data and visual data, or other forms of media content. By way of example, content may include television content and Internet content. Television content may include local programming, national programming, free programming, live-programming (e.g., a live broadcast, etc.), etc.), movies, sports, news, video-on-demand (VoD) content, premium channel content, premium channel bundles (e.g., Home Box Office and Cinemax, etc.), pay-per-view (PPV) content, television guides, weather information, sports information, traffic information, horoscope information, games, etc. Internet content may include podcasts, web sites, etc. The content may be in various formats, such as, for example, standard definition, high-definition, 3-D, etc.

According to exemplary embodiments described herein, an AI-based recommender may recommend content, customer equipment, types of service, levels of service, packages of service, etc., to a customer. According to an exemplary embodiment, the AI-based recommender may use rules, weights associated with the rules, as well as other data and factors to be described further below. In contrast to other recommenders, which make recommendations that are not customer-specific or not tailored to a particular customer, the AI-based recommender described may make recommendations that are customer-specific and tailored to the customer. For example, the customer may be identified when using a service based on a manual log-in or automatically identified (e.g., a device identifier that is mapped to the customer). Once the customer is identified, a qualification process may be initiated to select new products, services, etc., to the customer. For example, according to an exemplary embodiment, the qualification process may include identifying products, services, etc., to which the customer is subscribed and compare those products, services, etc., to a pool of products, services, etc., available. The qualification process may select products, services, etc., for which the customer qualifies. These selected products, services, etc., may be provided to the AI-based recommender. The AI-based recommender may then make customer-specific recommendations to the customer.

Additionally, according to an exemplary embodiment, a self-provisioner may provide the recommendations to the customer in a customer-specific manner. For example, the self-provisioner may generate user interfaces in correspondence to the customer-specific recommendations. For example, the self-provisioner may generate graphical user interfaces (GUIs) that correspond to the recommendations and which allow the customer to select the recommendations. For example, the customer may purchase content, a service, or other things which may be recommended, as described further below. In turn, the self-provisioner may process the customer's request and allow the customer to self-provision the purchasing, etc., various content, services, packages, equipment, etc.

FIG. 1A is a diagram illustrating an exemplary environment 100 in which an exemplary embodiment of an AI-based recommender and an exemplary embodiment of a self-provisioner may be implemented. As illustrated in FIG. 1A, environment 100 may include an SPN 105 and customer premises 150-1 through 150-N (referred to generally as customer premises 150). SPN 105 may include, among other devices, an AI recommender 110, a self-provisioner 115, and a customer identifier 120. Customer premises 150 may include, among other devices, televisions (TVs) 155-1 through 155-N (referred to generally as TV 155 or TVs 155), SPN TV interface devices 160-1 through 160-N (referred to generally as SPN TV interface device 160 or SPN TV interface devices 160), remote devices 165-1 through 165-N (referred to generally as remote device 165 or remote devices 165), user devices 170-1 through 170-N (referred to generally as user device 170 or user devices 170), and SPN Internet interface devices 175-1 through 175-N (referred to generally as SPN Internet interface device 175 or SPN Internet interface devices 175).

The number of devices and networks, and the configuration in environment 100 is exemplary and provided for simplicity. In practice, according to other embodiments, environment 100 may include additional devices, fewer devices, different devices, and/or differently arranged devices, than those illustrated in FIG. 1A. For example, SPN TV interface device 160 and TV 155 may be implemented as a part of user device 170. Additionally, or alternatively, for example, customer premises 150 may not include one or more of TV 155, SPN TV interface device 160, remote device 165, user device 170, or SPN Internet interface device 175.

Additionally, or alternatively, in practice, environment 100 may include additional networks, fewer networks, and/or differently arranged networks, than those illustrated in FIG. 1A. For example, customer premises 150 may include a local area network (LAN). Also, according to other embodiments, one or more functions and/or processes described as being performed by a particular device may be performed by a different device, or some combination of devices. By way of example, one or more functions and/or processes described as being performed by AI-based recommender 110 may be performed by self-provisioner 115 or vice versa. Environment 100 may include wired and/or wireless connections among the devices illustrated.

SPN 105 may include a network that distributes or makes available services, such as, for example, television service, Internet service, and/or voice service. SPN 105 may correspond to a satellite-based network and/or a terrestrial-based network. Although not illustrated, SPN 105 may include, for example, content distribution devices, content storage devices, application servers, billing devices, security devices, etc.

AI-based recommender 110 may generate one or multiple recommendations to a customer or a group of customers. For example, AI-based recommender 110 may recommend content, customer equipment (e.g., mobile phone, set top box, wireless router, cable modem, etc.), services (e.g., types of service, levels of service, packages of service), and/or other things that may relate to the service. According to an exemplary embodiment, AI-based recommender 110 may use rules, weights associated with the rules, as well as other data and factors to generate a recommendation. According to an exemplary embodiment, AI-based recommender 110 may use data (e.g., stored in a database) to generate a recommendation. For example, AI-based recommender 110 or some other system may perform data mining, knowledge discovery, etc., to create a repository of data to be used by AI-based recommender 110. By way of example, the data may include service usage (e.g., viewing patterns of content, etc.), purchasing history, changes of service, content searches, location of the customer, type of equipment, digital video recorder (DVR) usage, etc. Additionally, according to an exemplary embodiment, AI-based recommender 110 may use other factors, such as, for example, time of the year, the location of the customer, current events, and/or the state of the economy (e.g., based on market conditions, employment, etc). According to an exemplary embodiment, the weights associated with the rules may be dynamic and may change value depending on the data and/or other factors. AI-based recommender 110 may be implemented by one or multiple network devices and/or in a centralized or a distributed fashion. For example, the network device(s) may include a computational device (e.g., a computer, a server, etc.). AI-based recommender 110 will be described further below.

Self-provisioner 115 may provide a customer with the recommendations generated by AI-based recommender 110. According to an exemplary embodiment, self-provisioner 115 may generate a user interface that is customer-specific in correspondence to the customer-specific recommendations provided by AI-based recommender 110. Additionally, self-provisioner 115 may allow the customer to self-provision (e.g., subscribe to, etc.) the recommendations presented to the customer. For example, self-provisioner 115 may allow the customer to self-provision the changing of a service, the changing of equipment, the purchasing of content (e.g., based on promotions, offers, etc.), etc. Self provisioner 115 may be implemented by one or multiple network devices and/or in a centralized or a distributed fashion. For example, the network device(s) may include a computational device (e.g., a computer, a server, etc.). Self provisioner 115 will be described further below.

Customer identifier 120 may identify a customer. Depending on the devices used by the customer to access and use the services provided by SPN 105, customer identifier 120 may identify the customer based on a manual log-in or automatically. Customer identifier 120 may also select products, services, etc, associated with an identified customer for qualification purposes. Customer identifier 120 may be implemented by one or multiple devices and/or in a centralized or a distributed fashion. For example, customer identifier 120 may include a computational device (e.g., a computer, a server, etc.). Customer identifier 120 will be described further below.

Customer premises 150 may include a location where customer(s) receive services from SPN 105. For example, customers may receive services at home, at work, or locations while customers are mobile. As illustrated, customer premises 150 may include devices that allow customers to receive services, such as, for example, television, Internet, and/or voice from SPN 105. As illustrated, customer premises 150 may include exemplary customer premise equipment, such as, for example, TVs 155, SPN TV interface devices 160, remote devices 165, user devices 170, and SPN Internet interface devices 175.

TV 155 may include a device to display content. According to an exemplary embodiment, TV 155 may correspond to a television. According to other embodiments, TV 155 may correspond to other types of display devices, such as, for example, a monitor, a mobile device having a display, a laptop computer, user device 170, etc. According to an exemplary embodiment, TV 155 and SPN TV interface device 160 may be separate devices, as illustrated in FIG. 1A. According to other embodiments, TV 155 may include SPN TV interface device 160 or include some of the functionalities associated with SPN TV interface device 160.

SPN TV interface device 160 may include a device that communicates with SPN 105 to provide television services and/or content to a customer. According to an exemplary embodiment, SPN TV interface device 160 may include a client, a thin client, a set-top box, a converter box, a receiver, a server, a peer device, a tuner, and/or a digibox. According to an exemplary embodiment, SPN TV interface device 160 may also include a digital video recorder (DVR) and/or a hard drive. SPN TV interface device 160 may also provide multi-room services.

Remote device 165 may include a device that communicates with TV 155 and/or SPN TV interface device 160 to allow a customer to interact with SPN TV interface device 160 and/or TV 155. Remove device 165 may also include a device that communicates with other devices in communication with TV 155 and/or SPN TV interface device 160. Remote device 165 may include one or multiple input mechanisms (e.g., buttons, a display, a touchpad, a microphone, etc.) to receive a customer's input and, among other things, allow the customer to interact with SPN TV interface device 160. According to an exemplary embodiment, remote device 165 may correspond to a remote control device (e.g., a set-top box controller, a TV controller, a converter box controller, etc.). According to other embodiments, remote device 165 may correspond to, for example, a tablet device, a mobile communication device, or some other type of user device. According to still other embodiments, remote device 165 may include TV 155. According to yet other embodiments, remote device 165 may include TV 155 and SPN TV interface device 160 or include some of the functionalities associated with SPN TV interface device 160.

User device 170 may include, for example, a mobile device, a stationary device, a handheld device, a wrist-worn device, a tablet device, or a portable device. For example, user device 170 may include a computational device (e.g., a desktop computer, a laptop computer, a palmtop computer, etc.), a communication device (e.g., a wireless phone, a wired phone, an Internet-access device, etc.), a gaming device, a multimedia device (e.g., a music playing device, a video playing device, etc.), a data organizing device (e.g., a personal digital assistant (PDA), etc.), and/or some other type of user device. User device 170 may be capable of communicating with one or more devices in customer premises 150 and/or SPN 105. Additionally, as previously described, user device 170 may include one or more of the devices described in customer premises 150, such as, for example, TV 155, SPN TV interface 160, etc.

SPN Internet interface device 175 may include a device that communicates with SPN 105 to provide Internet services and/or Internet content to a customer. SPN Internet interface device 175 may also communicate with other devices associated with customer premises 150. According to an exemplary embodiment, SPN Internet interface device 175 may include a modem, a wireless router, a wired router, a gateway, or some other type of communication device.

FIGS. 1B-1G are diagrams illustrating an exemplary process associated with an exemplary embodiment of AI-based recommender 110 and an exemplary embodiment of self-provisioner 115.

Figure 1B:
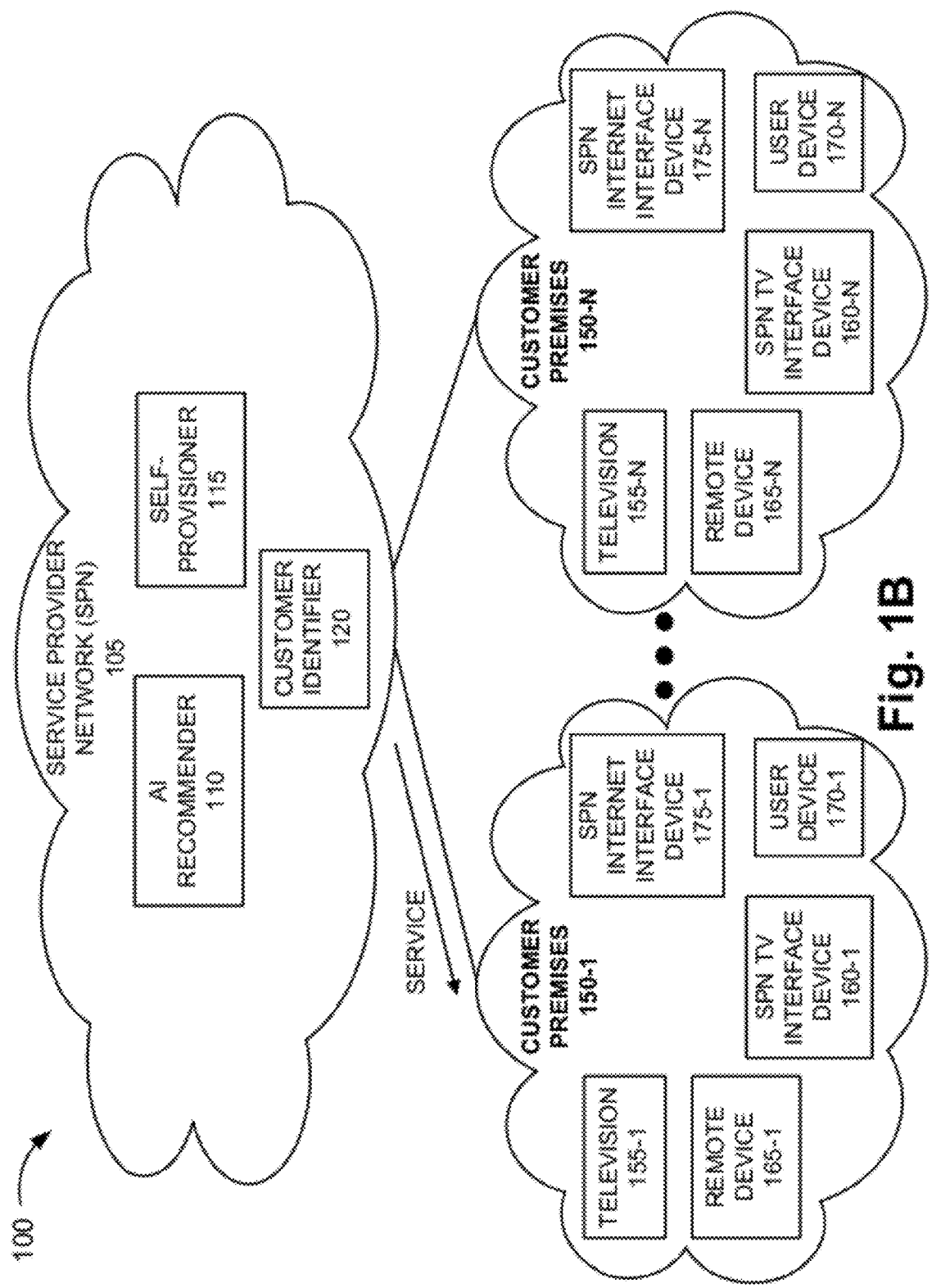

Referring to FIG. 1B, SPN 105 may provide television service to customer premises 150-1. As illustrated in FIG. 1C, SPN TV interface device 160-1 may determine whether to send a unique device identifier to customer identifier 120. For example, SPN TV interface device 160-1 may determine whether there is a marketing campaign taking place. If so, SPN TV interface device 160-1 may determine to send a device identifier to customer identifier 120. The device identifier may correspond to, for example, an equipment identifier and/or a network address (e.g., a media access control (MAC) address, an Internet Protocol (IP) address, etc.).

Figure 1D:
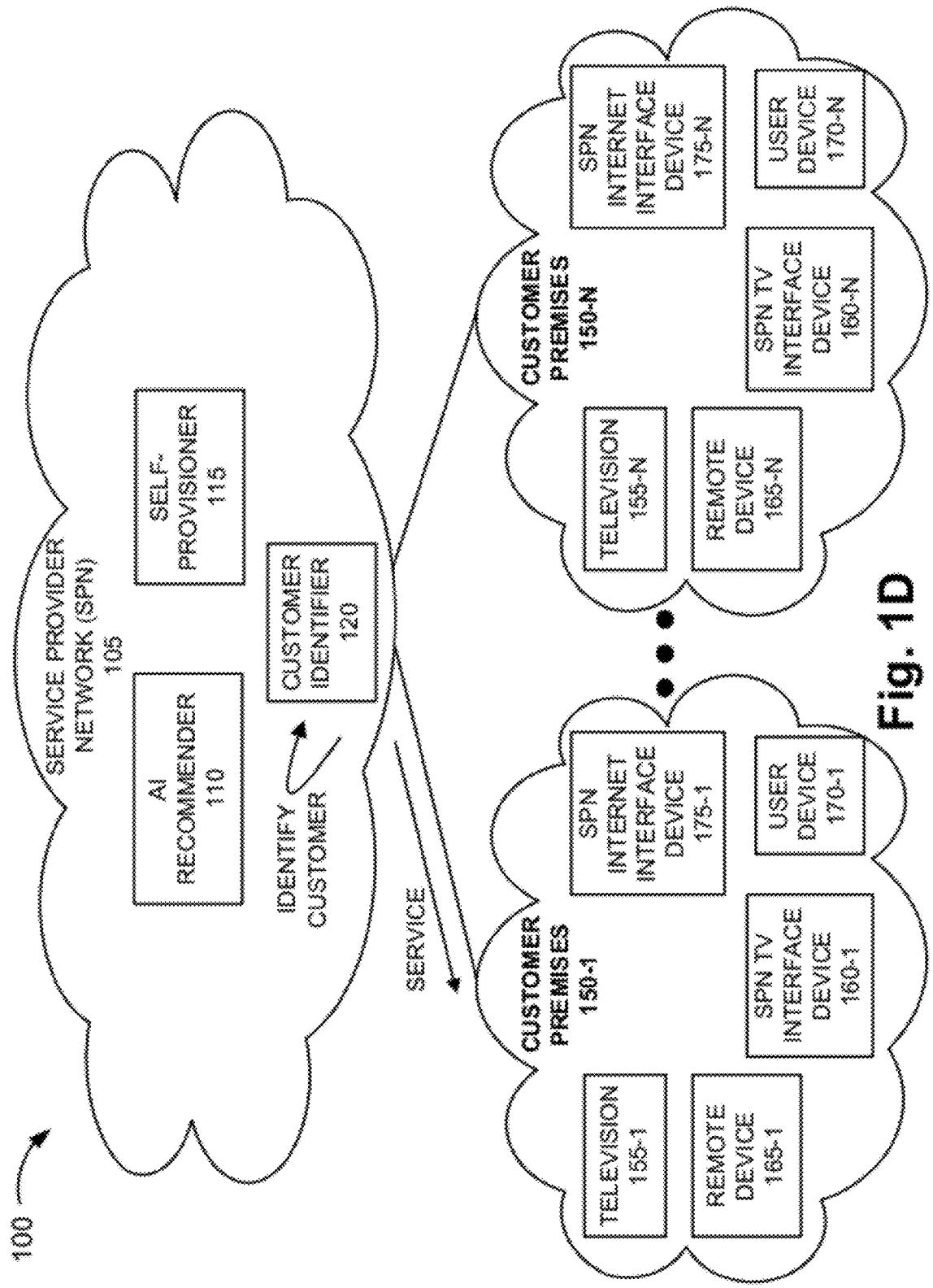

Referring to FIG. 1D, customer identifier 120 may receive the device identifier and use this information to identify the customer. For example, customer identifier 120 may access a customer profile database that provides for the mapping of the device identifier to a customer. In a household setting having multiple persons (e.g., mother, father, children, etc.) and only one person is billed (e.g., father), information pertaining to which room SPN TV interface device 160-1 resides (e.g., family room, bedroom, etc.) and/or the customer associated with SPN TV interface device 160-1 may be initially obtained during installation, from the customer, etc.

Figure 1E:
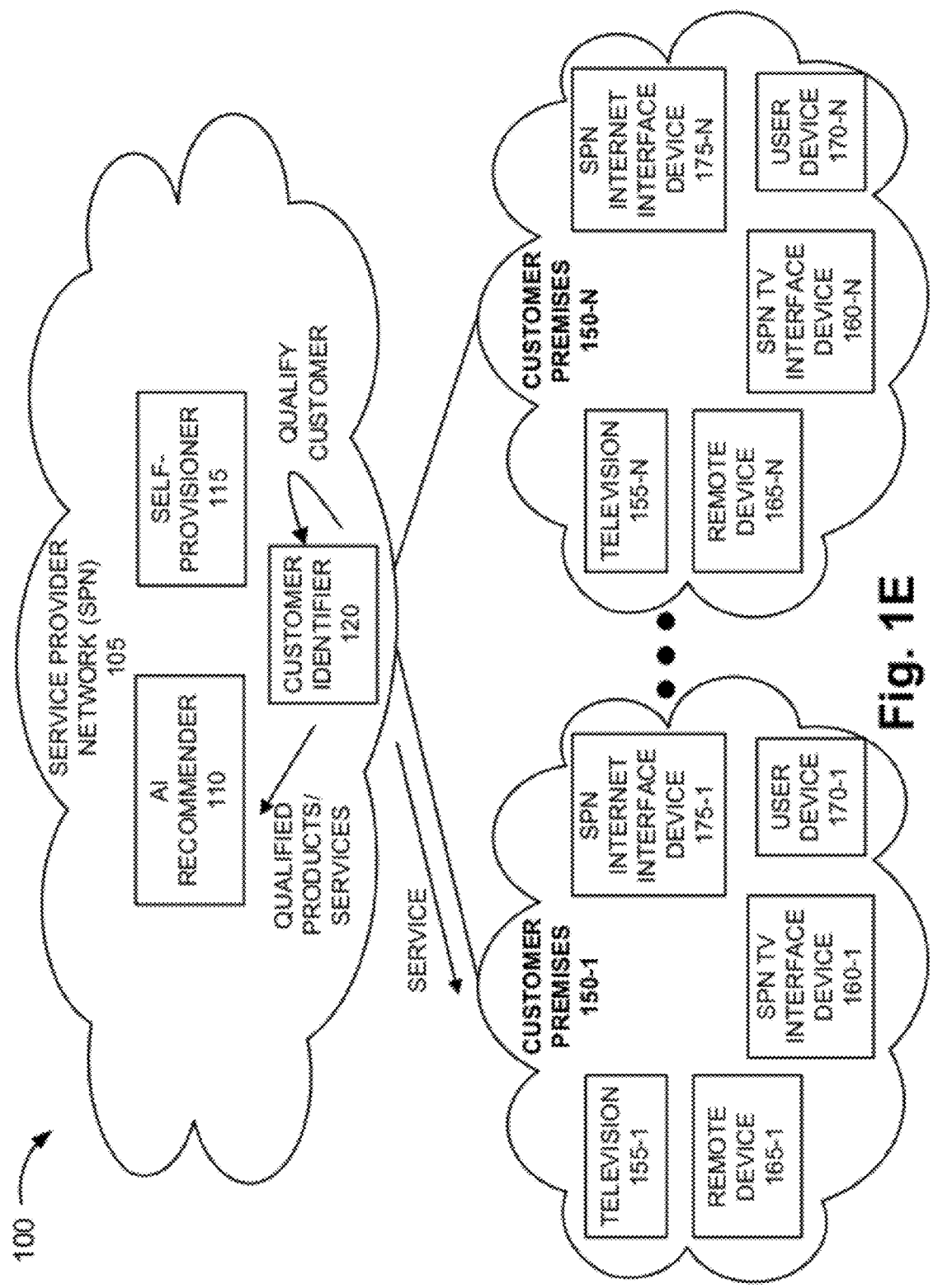

As illustrated in FIG. 1E, once the customer is identified, customer identifier 120 may begin a qualification process. For example, customer identifier 120 may identify the products, services, etc., associated with the customer (e.g., the customer's account, etc.) and then check all products, services, etc., that may be available to the customer. Based on a comparison between products, services, etc., currently associated with the customer and those available, customer identifier 120 may select products, services, etc., for which the customer qualifies. For example, a particular marketing campaign may target certain customers that subscribe to a certain level of television service. Customer identifier 120 may select particular content to up-sell to those customers. As further illustrated, the qualified products, services, etc., may be provided to AI-based recommender 110.

Figure 1F:
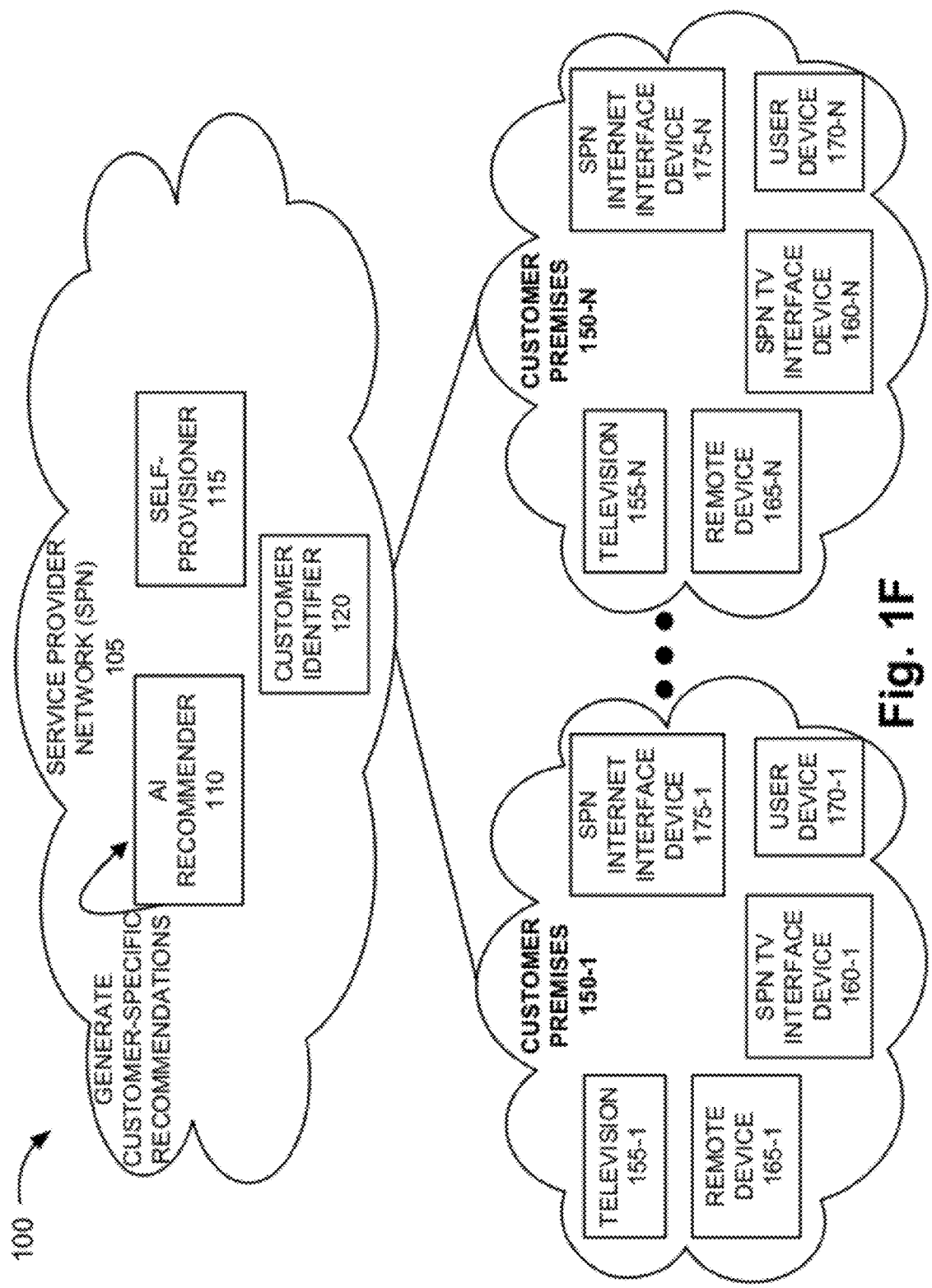
Figure 1G:
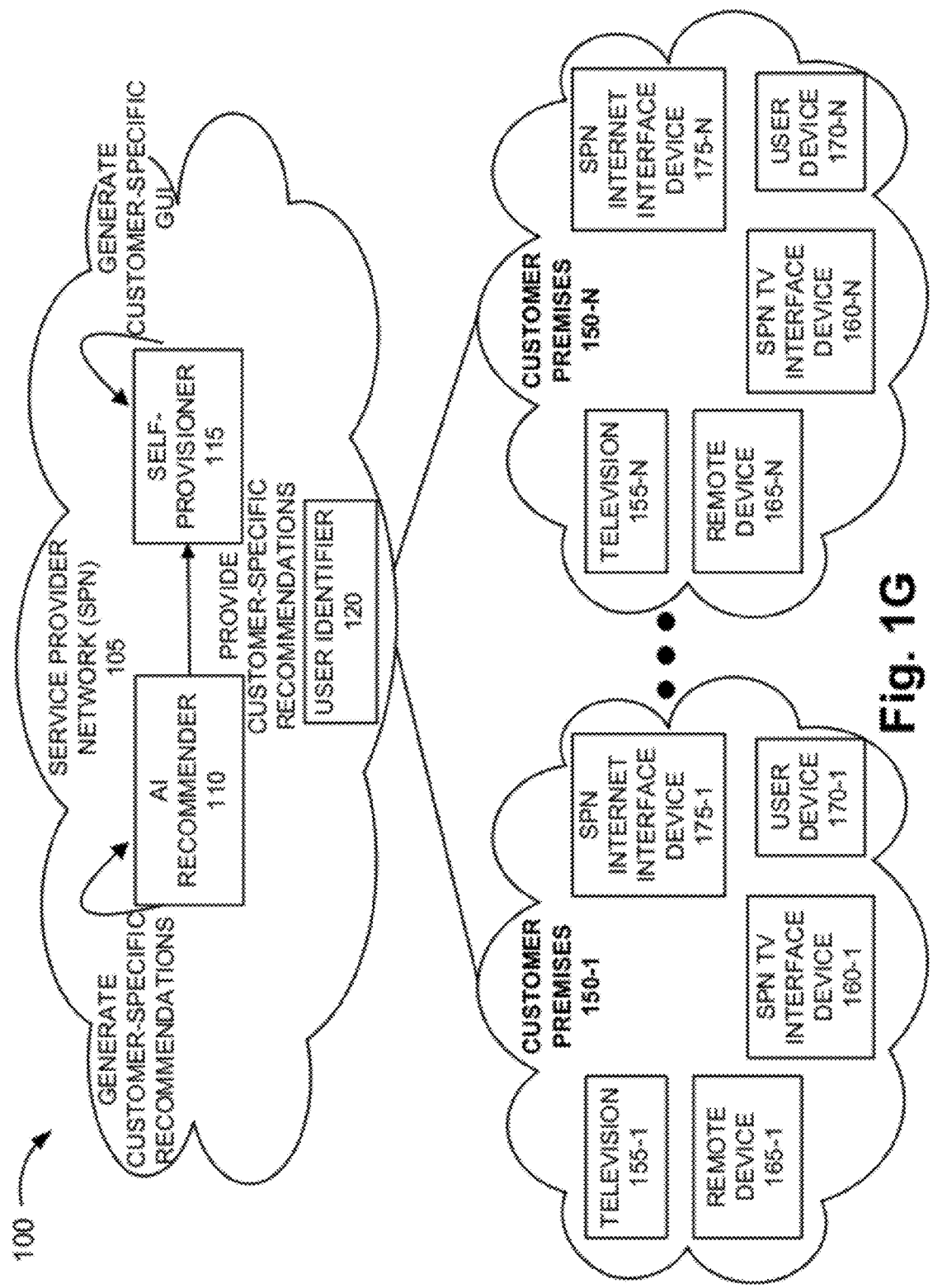

As illustrated in FIG. 1F, AI-based recommender 110 may generate customer-specific recommendations based on qualified products, services, etc. AI-based recommender 110 may use rules, weights associated with the rules, as well as other data and factors to generate one or multiple recommendations. Referring to FIG. 1G, AI-based recommender 110 may provide the generated recommendation(s) to self-provisioner 115. Self-provisioner 115 may generate a customer-specific GUI in correspondence to the generated recommendations. By way of example, the customer-specific GUI may include several screens that the customer may access and navigate. The several screens may have a particular order in correspondence to the generated recommendations. For example, the order may correspond to a probability that the customer may be interested in the particular content or package presented in the screen.

Figure 1H:
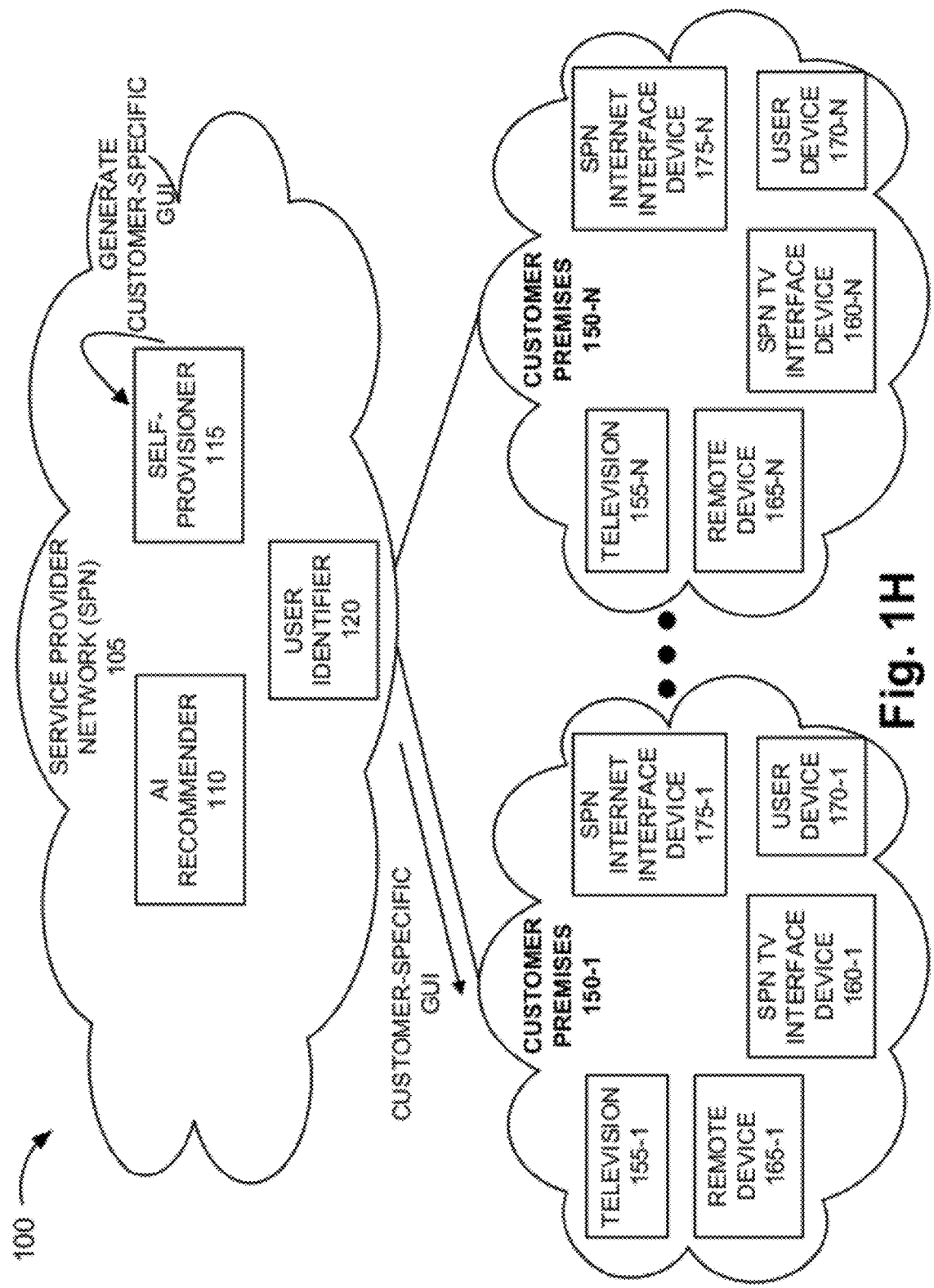
Figure 1I:
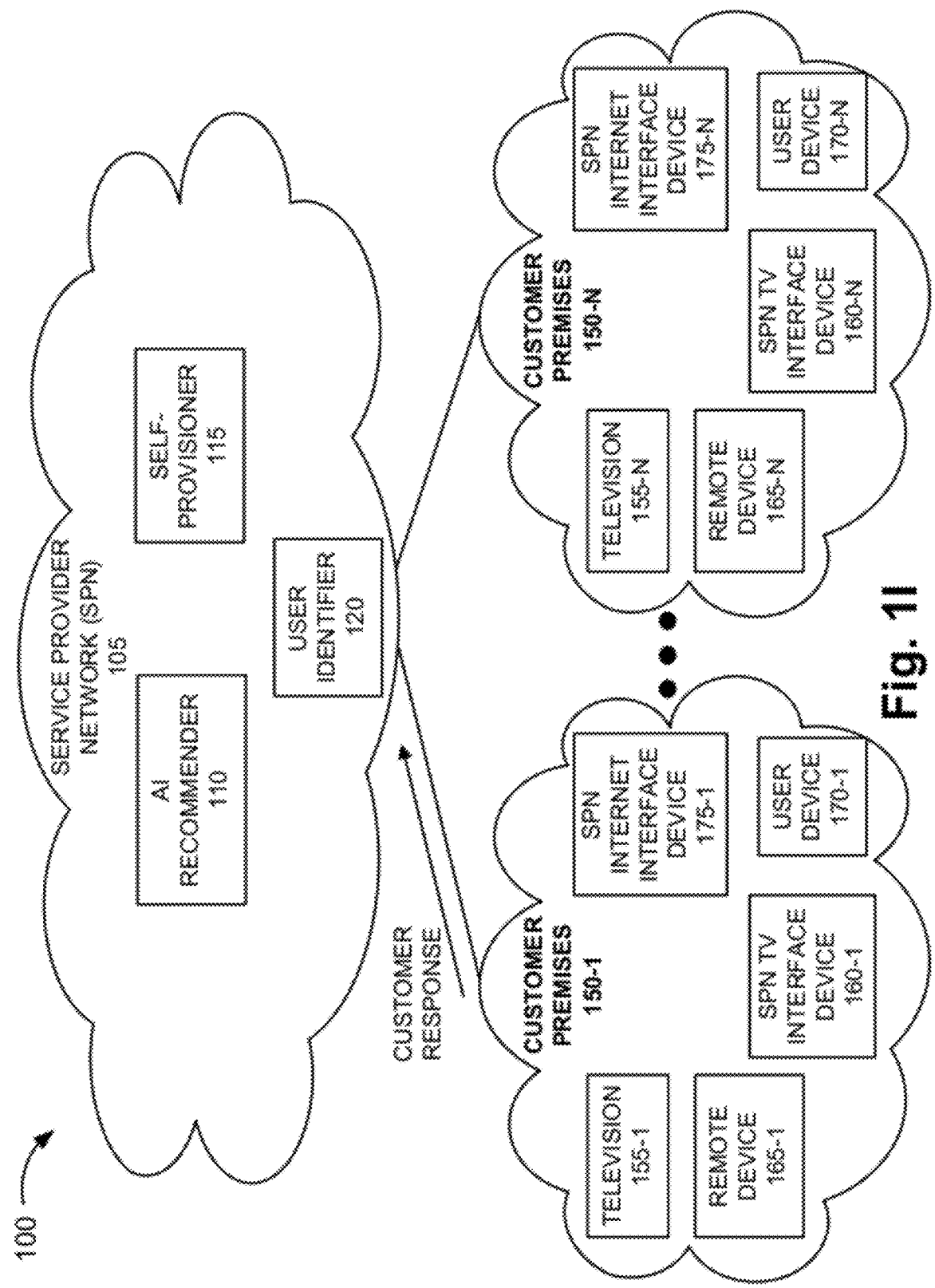
Figure 1J:
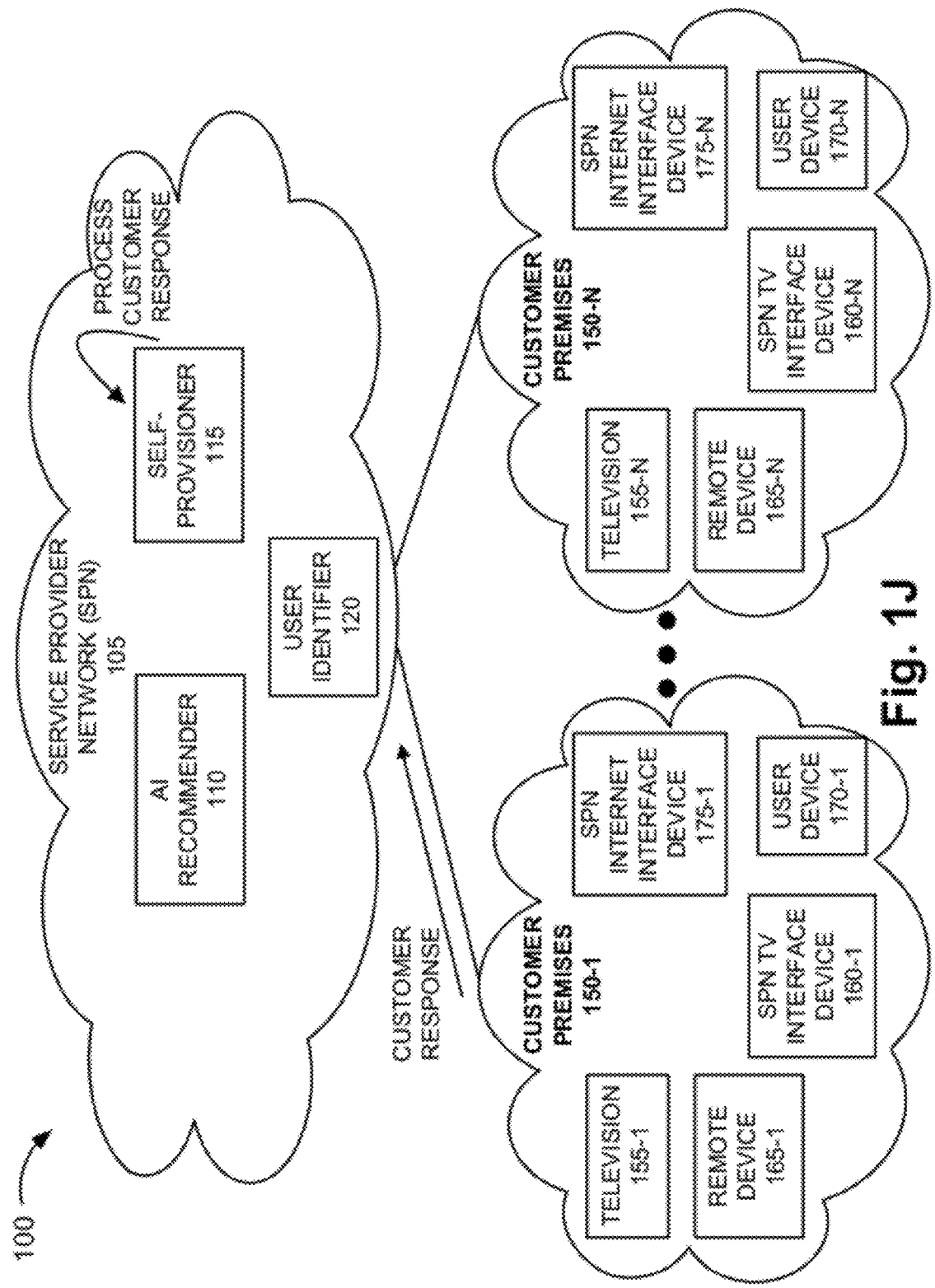

As illustrated in FIG. 1H, self-provisioner 115 may send the customer-specific GUI to the customer via television 155. The customer (not illustrated) may view and interact with the customer-specific GUI. In this example, the customer may select a particular package from the customer-specific GUI and the customer's response may be sent to self-provisioner 115, as illustrated in FIG. 1I. Referring to FIG. 1J, self-provisioner 115 may process the customer's response to allow the customer to receive the selected package as a part of the customer's television service.

In view of the foregoing, the customer may receive customer-specific (i.e., customized, personalized, etc.) recommendations relating to a service, products, etc. This is in contrast to other approaches in which a customer may receive a non-customer specific (e.g., generic) recommendations relating to a service, products, etc. For example, typically, each customer receives the same promotional offers.

Figure 2:
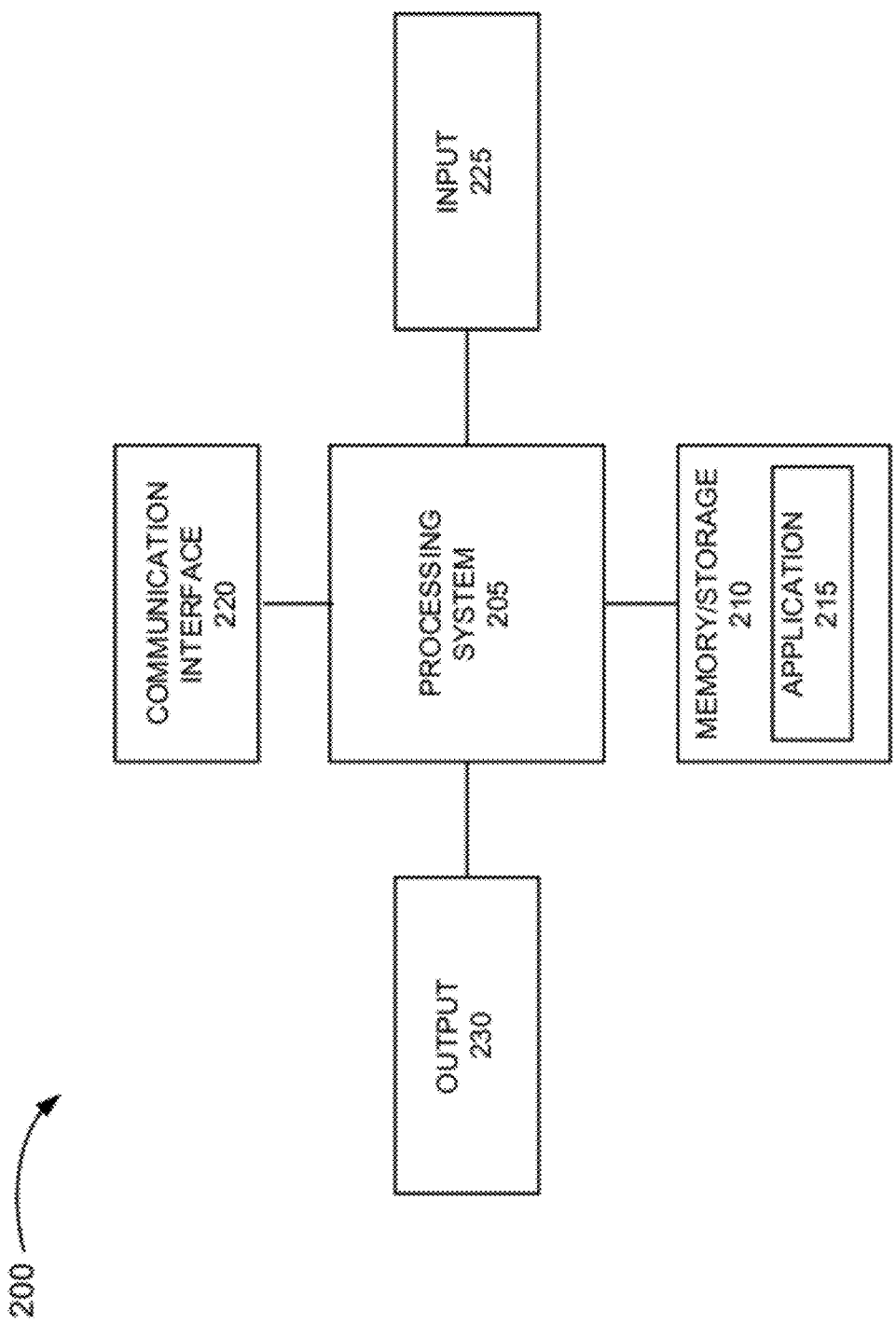
FIG. 2 is a diagram illustrating exemplary components of a device that may correspond to one or more of the devices in the environment depicted in FIGS. 1A-1J.

FIG. 2 is a diagram illustrating exemplary components of a device 200 that may correspond to one or more of the devices in environment 100. For example, device 200 may correspond to one or more devices in SPN 105 (e.g., AI-based recommender 110, self-provisioner 115, etc.) and/or customer premises 150 (e.g., remote device 165, user device 170, etc.). As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of storage devices. For example, memory/storage 210 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 210 may include a hard disk (e.g., a magnetic disk, an optical disk, a magneto-optic disk, a solid state disk, etc.) or some other type of storing medium, along with a corresponding drive. Memory/storage 210 may be external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to include, for example, a memory, a storage medium, a CD, a DVD, a Blu-ray disc, or another type of tangible storing medium. Memory/storage 210 may store data, application(s), and/or instructions related to the operation of device 200.

Applications 215 may include software that provides various services and/or functions. For example, with reference to AI-based-recommender 110 and according to an exemplary embodiment, application 215 may include one or multiple applications for data mining, evaluating data, generating recommendations, etc. Additionally, or alternatively, for example, with reference to self-provisioner 115 and according to an exemplary embodiment, application 215 may include one or multiple applications for providing the recommendations to the customer, such as, generating user interfaces, processing the customer's selections, etc.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing software instructions (e.g., application 215) stored by memory/storage 210. By way of example, the software instructions may be read into memory/storage 210 from another memory/storage 210 or from another device via communication interface 220. The software instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

Figure 3A:
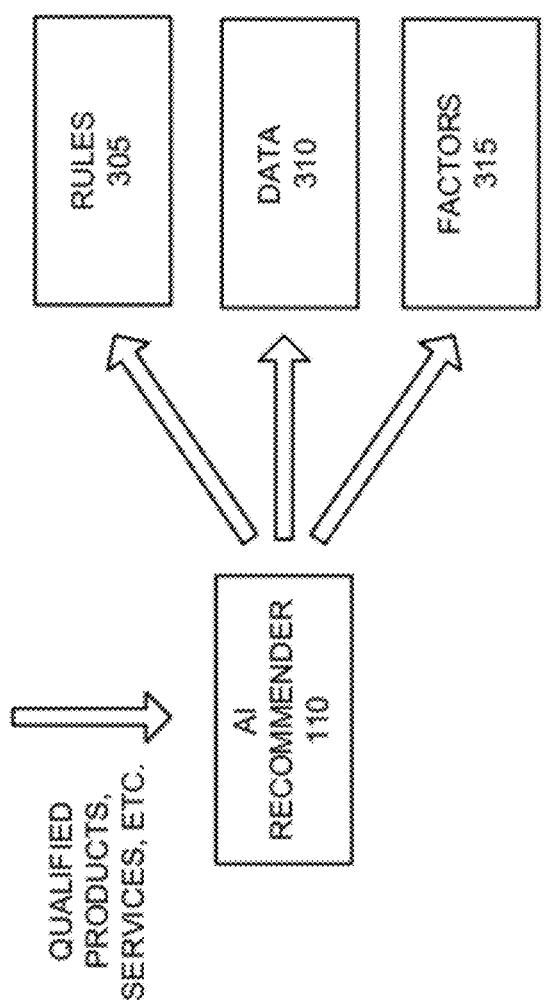
FIG. 3A is a diagram illustrating exemplary criteria that an exemplary embodiment of an AI-based recommender may use to generate recommendations.

FIG. 3A is a diagram illustrating exemplary criteria that AI-based recommender 110 may use to generate recommendations. For example, as illustrated, AI-based recommender 110 may receive a list of qualified products, services, etc., pertaining to a customer. AI-based recommender may use rules 305, data 310, and factors 315 to generate recommendations. According to other exemplary embodiments, AI-based recommender 110 may use additional, fewer, and/or different types of rules, data, factors, etc.

For purposes of description, rules 305 may be categorized as primary rules, secondary rules, and exclusionary rules, however, other categorizations may be used and/or such categorizations may not be used. The primary rules may include criteria that are based on, among other things, customer profile, customer behavior (e.g., usage, etc.), customer affinities, associations between customer's current subscription, equipment, etc., and possible recommendations, customer's changes in service (e.g., purchasing, cancelling, upgrading, etc.), popularity of recommendations, etc. For example, according to an exemplary embodiment, the primary rules may include criteria pertaining to one or more of the following: (1) migration history; (2) association of possible recommendations with one or more factors (e.g., location, time of year, etc.); (3) customer affinity based on customer's current subscription, equipment, level of service, and/or other service-related parameters, relative to possible recommendations; (4) customers' previous purchase and cancellation of possible recommendations; (5) customer's current subscription, equipment, etc., and all possible recommendations (e.g., based on popularity); (6) based on customer's viewership of content; or (7) sale statistics of possible recommendations.

The secondary rules may include criteria that may be based on, among other things, time-based criteria (e.g., time difference between last purchase and recommendation date, length of time customer has been a customer, etc.), customer interest (e.g., with respect to a recommendation, other content, other services, etc.), trends of recommendations with respect to other customers, an appreciation value or a depreciation value of a recommendation with respect to a location associated with the customer, etc. An example of secondary rules is described below.

The exclusionary rules may include criteria that may eliminate a recommendation from being provided to a customer. For example, the customer may already have the recommended service, the recommended equipment, the recommended content, etc. (e.g., a recent purchase, etc.), internal marketing directives may prohibit the offering of particular recommendations, the customer's history indicates previous exposure to the recommendation but no interest, etc.

As previously described, according to exemplary embodiments, weights may be associated with rules 305. According to an exemplary embodiment, AI-based recommender 110 may use these weights for generating recommendations. For example, when AI-based recommender 110 generates recommendations relating to content, a weight may be assigned to a particular content. AI-based recommender 110 may use these weights to determine which content to select as a recommendation. According to an exemplary embodiment, AI-based recommender 110 may have a maximum weight for a recommendation (e.g., not greater than 1, etc.). According to another exemplary embodiment, AI-based recommender 110 may not have a maximum weight for a recommendation. Rules 305 and weights associated with rules 305 are described further below.

Depending on the service(s) to which the customer is subscribed, the generated recommendations may be provided to the customer via those service(s). In the case of when the customer subscribes to multiple services, the recommendations may be provided to the customer via one or more of those services. For example, recommendations for voice service or Internet service may be provided to the customer via the customer's television service, in addition to or instead of, via the customer's phone service or Internet service.

Referring back to FIG. 3A, AI-based recommender 110 may use data 310 and factors 315, in addition to rules 305, to generate recommendations. Data 310 may include various types of data pertaining to customers. By way of example, data 310 may include service usage (e.g., viewing patterns of content, number of calls, type of calls (e.g., long distance, international, etc.) etc.), purchasing history, cancellation history, changes of service, content searches, location of the customer, type of equipment, type of service (e.g., level of service, etc.), calls to customer service (e.g., content of calls, etc.), digital video recorder (DVR) usage, etc. Data 310 may include archived data (e.g., recommendation data, data-mined data, etc.), as further described with respect to FIG. 3B. Depending on which rule 305 is used, data 310 may pertain to the customer to which the recommendation is directed and/or pertain to other customers.

Additionally, according to an exemplary embodiment, AI-based recommender 110 may use factors 315. By way of example, factors may include time of the year (e.g., week, month, season, holiday, etc.), the location of the customer (e.g., ZIP code of customer, city of customer, state of customer, etc.), current events (e.g., success of a sports team, success of a movie, which may be shown on a premier movie channel, etc.), the state of the economy (e.g., strength of economy vis-à-vis price of recommendation, etc.), sale history pertaining to a recommendation, release of new service (e.g., from cable to fiber optic), etc.

According to an exemplary embodiment, AI-based recommender 110 may use one or more portions of data 310 and/or factors 315, in conjunction with rules 305 to generate recommendations. For example, AI-based recommender 110 may use data 310 and/or factors 315 to generate a recommendation and/or a weight associated with the recommendation.

Described below is an example of the primary rules, the secondary rules, and the exclusionary rules of rules 305. In this example, rules 305 may pertain to generating recommendations for television content. For example, the television content may correspond to a package or a bundle of packages (e.g., a premier movie package, a sports package, movie bundles, etc.). According to other exemplary embodiments, rules 305 may pertain to generating recommendations for other types of content, equipment, etc., as previously described. Additionally, in this example, data 310, and factors 315 may relate to generating recommendations that pertain to television content. In this regard, depending on the service (e.g., television, Internet, voice, etc.) and/or content for which a service provider may be generating recommendations, rules 305, data 310, and/or factors 315 may be different than that described in this example. For example, with respect to voice service, AI-based recommender 110 may generate recommendations relating to service packages (e.g., a long-distance calls package, an international calling package, etc.). Similarly, with respect to Internet service, AI-based recommender 110 may generate recommendations relating to service packages (e.g., upload/download speed packages, etc.). Additionally, for example, AI-based recommender 110 may generate recommendations on a per customer basis or a per device basis. For example, if the customer has multiple SPN TV interface devices 160, AI-based recommender 110 may generate recommendations independently for each SPN TV interface device 160 versus on a customer basis.

In this example, the primary rules may include criteria pertaining to the following: (1) migration from one package to another package; (2) association of packages with respect to one or multiple factors for customers that have at least one package; (3) affinity of a customer purchasing a portion of a multi-package combination when the customer already is subscribed to another portion of the multi-package combination; (4) affinity of a customer having a package to purchase another package; (5) purchases and cancellations of the same package; (6) current package of the customer and all combinations of packages that may be offered with the current package; (7) the customer's viewing of a sports package to recommend another sports package; (8) association of packages with respect to one or multiple factors for customers with no packages; (9) an assessment of the sales of a newly launched package, and an affinity of the customers' current package(s) with the newly launched package. The primary rules are described further below.

As previously described, the primary rules of rules 305 may include migration from one package to another. For example, the rule may pertain to an affinity of a customer having a package (e.g., a package X) to purchase another package (e.g., a package Y). The weight associated with this rule may correspond to a probability of the customer having the package X and purchasing the other package Y. The weight may be calculated according to the following exemplary expression:

Weight=[no. of customer purchasing package $Y$ after package $X$]/[no. of customers purchasing package $X$].

According to an exemplary embodiment, a weight may be calculated for all package combinations. If a customer has the package X, then AI-based recommender 110 may select a package Y having a higher weight relative to another package Y. Additionally, if package Y does not include package X, but a combination offer exists that includes both package X and package Y, AI-based recommender 110 may select the combination offer.

With reference to the next rule (i.e., rule 2), the primary rules of rules 305 may include an association of packages with one or multiple factors (e.g., location, time of year, etc.) for customers that have at least one package. The weight associated with this rule may correspond to a level of association (e.g., the greater the weight, the higher the association is with the factor(s)). The weight may be calculated according to the following exemplary expression:

Weight=[no. of particular package sold]/[total no. of packages sold].

For example, if the factor corresponds to location (e.g., ZIP code), the weight may be calculated for a particular ZIP code with respect to a particular package sold and all packages sold in the ZIP code.

On the basis of the weight, AI-based recommender 110 may select one or multiple packages. For example, AI-based recommender 110 may select a package having a higher weight than another package having a lower weight.

According to an exemplary embodiment, AI-based recommender 110 may calculate another weight (i.e., a second weight) for the one or multiple packages selected based on the first weight. For example, the second weight may correspond to sales of the package with respect to one or multiple time periods (e.g., 2 months, 6 months, 1 year, etc.). If multiple time periods are used, AI-based recommender 110 may calculate differential changes in the percentage of sales. Additionally, or alternatively, AI-based recommender 110 may calculate an average percentage of sales of the package based on the one or multiple time periods. Additionally, or alternatively, AI-based recommender 110 may calculate the above-mentioned sales trends on a per location-basis (e.g., per ZIP code, etc.).

According to an exemplary embodiment, when AI-based recommender 110 may calculate multiple weights, such as the first weight and the second weight, AI-based recommender 110 may determine a final weight. By way of example, the first weight and the second weight may be added together or some other type of mathematical operation (e.g., division, subtraction, multiplication, etc.) may be performed to determine the final weight. According to an exemplary embodiment, AI-based recommender 110 may identify customers (e.g., customer identifiers, etc.) and/or customer premises devices (e.g., SPN TV interface devices 160, etc., by way of address, equipment identifier, etc.) that are not subscribed to the one or multiple packages selected. AI-based recommender 110 may select one or multiple packages based on the above information (e.g., final weights, packages to which customers are not subscribed, etc.).

With reference to the next rule (i.e., rule 3), the primary rules of rules 305 may include an affinity of a customer purchasing a portion of a multi-package combination when the customer already is subscribed to another portion of the multi-package combination. For example, suppose a customer has two packages of a combination that includes three packages. The weight associated with this rule may correspond to a ratio of a customer having the complete multi-package combination to those that may have only a portion of the multi-package combination. According to such an example, the weight may correspond to a ratio of a customer having all three packages to those customers having two packages of the three packages available. The weight may be calculated according to the following exemplary expression:

$$\text{Weight} = [\text{no. of customers having all packages of a combination}]/[\text{no. of customers having a portion of the packages of the combination}].$$

The weight may be calculated for all package combinations. For example, according to the three package scenario, the weight may be expressed according to the following exemplary expression:

$$\text{Weight} = [\text{no. of customers having packages } X, Y, Z]/[\text{no. of customers having a portion of the packages } X, Y, Z].$$

In this example, the weight may be calculated for customers that have packages X and Y, packages X and Z, packages Y and Z, as well as the remaining package combinations.

According to an exemplary embodiment, AI-based recommender 110 may recommend the missing package(s) of the combination that has/have the highest weight(s).

With reference to the next rule (i.e., rule 4), the primary rules of rules 305 may include an affinity of a customer having a package to purchase another package. For example, suppose a customer has a package X but does not have a package Y. The weight associated with this rule may correspond to a probability of the customer having a package to purchase another package. The weight may be calculated according to the following exemplary expression:

$$\text{Weight} = [\text{no. of customers having multiple packages}]/[\text{no. of customers purchasing less than the multiple packages}]$$

The weight may be calculated for all package combinations. For example, according to a two package scenario in which the customer has package X and a package Y may be recommended, the weight may be expressed according to the following expression:

$$\text{Weight} = [\text{no. of customers having packages } X \text{ and } Y]/[\text{no. of customers purchasing package } X],$$

in which it is assumed that the customer already has package X. According to an exemplary embodiment, AI-based recommender 110 may recommend the package with the highest weight.

With reference to the next rule (i.e., rule 5), the primary rules of rules 305 may include purchase and cancellation histories of the same package with other customers and/or the customer to which the recommendation may be directed. The weight may be calculated according to the following exemplary expression:

$$\text{Weight} = ([\text{no. of purchases of this package}]/[\text{no. of purchases of all of the packages}]) * \text{Constant},$$

in which the constant may correspond to a normalization factor that may have a value between 0 and 1. According to an exemplary embodiment, AI-based recommender 110 may recommend the same package or a combination of packages if there are any package(s) available.

With reference to the next rule (i.e., rule 6), the primary rules of rules 305 may include a customer's current package and all combinations of packages that may be offered with the current package. For example, based on the customer's current package, all combination of packages may be considered. According to an exemplary embodiment, the weight may be calculated based on the popularity of the combination package being recommended.

With reference to the next rule (i.e., rule 7), the primary rules of rules 305 may include the customer's viewing of a sports package to recommend another sports package. The weight may be calculated as an average of the maximum weights for each customer with respect to recommendation(s) made by the other primary rules.

With reference to the next rule (i.e., rule 8), the primary rules of rules 305 may include an association of packages with one or multiple factors (e.g., location, time of year, etc.). This rule is identical to rule 2. However, this rule may apply to customers that do not have any packages. The weight associated with this rule may correspond to a level of association (e.g., the greater the weight, the higher the association is with the factor(s)). The weight may be calculated according to the following exemplary expression:

$$\text{Weight} = [\text{no. of particular package sold}]/[\text{total no. of packages sold}]$$

For example, if the factor corresponds to location (e.g., ZIP code), the weight may be calculated for a particular ZIP code with respect to a particular package sold and all packages sold in the ZIP code.

On the basis of the weight, AI-based recommender 110 may select one or multiple packages. For example, AI-based recommender 110 may select a package having a higher weight than another package having a lower weight.

With reference to the next rule (i.e., rule 9), the primary rules of rules 305 may include an assessment of the sales of a newly launched package, and an affinity of the customer's current package(s) with the newly launched package. The weight pertaining to the sales of the newly launched package may be calculated according to the following exemplary expression:

$$\text{Weight} = [\text{no. of sales of newly launched package}]/[\text{total no. of packages sold}],$$

in which the sales may be considered over some period of time (e.g., 30 days, etc.).

In addition, the weight pertaining to the affinity of the customer's current package(s) may be calculated according to the following exemplary expression:

Weight=[customer with a package having an affinity to the newly launched package]/[total no. of customers having the newly launched package], in which for customers that have the newly launched package, it is determined what other packages, if any, they may have.

AI-based recommender 110 may determine a final weight based on the above-mentioned weights. By way of example, the first weight and the second weight may be added together or some other type of mathematical operation (e.g., division, subtraction, multiplication, etc.) may be performed to determine the final weight. According to an exemplary embodiment, AI-based recommender 110 may select a newly launched package to recommend to a customer based on the final weight.

In this example, the secondary rules may include criteria pertaining to the following: (1) the weight for the recommendation packages may be increased if the duration between a last purchase date and the recommendation date is less than an average duration for customers that transition between the current package and the recommendation packages; (2) the weight for the recommended packages may be increased if the customer ever viewed the recommended packages; and (3) regional package weight depreciation. AI-based recommender 110 may apply the secondary rules to recommendation data generated based on the primary rules.

As previously described, the secondary rules of rules 305 may include increasing the weight of recommended packages if the duration between the last purchase date and the recommendation date is less than an average duration for customers that transition between the current package and the recommendation packages. According to this rule (i.e., rule 1), customers that have purchased more than one packages (e.g., two or more) may be identified. Then, for each customer, all the possible combination of packages purchased (referred to as a to-package) and all the possible combination of packages previously purchased (referred to as a from-package), as well as the duration between the two purchases may be determined.

AI-based recommender 110 may determine the number of customers making purchases of the to-package when they already have purchased the from-package, during the particular duration. AI-based recommender 110 may group the customers according to the number of customers pertaining to the packages corresponding to the to-and-from packages. AI-based recommender 110 may select a certain number of groups (e.g., top group(s)) to further consider for recommendations.

According to an exemplary embodiment, AI-based recommender 110 may calculate an average number of days taken by the customers in each group to purchase the to-package relative to when the customers purchased the from-package. AI-based recommender 110 may then determine whether the customer to which AI-based recommender 110 is recommending, has the recommended package as the to-package and the from-package, and the duration between the last date of purchase and the recommended date is less than or equal to a particular time period (e.g., 4 days, etc.), the weight assigned to the recommended package may be increased by a particular percentage or multiplier (e.g., 150%, 1.3 times, etc.).

With reference to the next rule (i.e., rule 2), the secondary rules of rules 305 may include increasing the weight of a recommended package if the customer has viewed any of the recommended package. By way of example, if the customer had viewed a free weekend of HBO, then if the recommended package corresponds to a subscription to HBO, the weight of the recommended package may be increased by a particular percentage or multiplier.

With reference to the next rule (i.e., rule 3), the secondary rules of rules 305 may include decreasing the weight of recommended packages that correspond to regional packages (e.g., a Spanish package, etc.) when the customer has already viewed the recommended package, made price inquiries with respect to the recommended package, or expressed some other initial interest in the recommended package, but never purchased the recommended package.

In this example, the exclusionary rules may include criteria pertaining to the following: (1) eliminate a recommendation for customers that have multiple views of the package but no purchases (e.g., reflecting a lesser probability of conversion); (2) eliminate a recommendation if the customer has already purchased the package; and (3) exclude a recommendation if the package is not supposed to be recommended. AI-based recommender 110 may apply the exclusionary rules to recommendation data generated based on the secondary rules.

As previously described, the exclusionary rules may include eliminating a recommendation for a customer that has had multiple views of the recommendation package but no purchases. For example, AI-based recommender 110 may determine what packages the customer has viewed and purchased. With reference to the next rule (i.e., rule 2), AI-based recommender 110 may eliminate a recommendation if the customer has already purchased the recommended package. Additionally, with reference to the next rule (i.e., rule 3), AI-based recommender 110 may eliminate a recommendation if the package is a package that cannot be recommended. By way of example, the package may correspond to particular content that the customer has requested not to receive (e.g., related to content filtering). According to another example, the customer may be receiving a free promotional offer a package (e.g., 3 free months of HBO) and the service provider may wish to prohibit certain other packages from being recommended (e.g., 3 free months of Starz) while the customer is already receiving the free promotional offer.

According to an exemplary embodiment, AI-based recommender 110 may use additional rules if, for example, a sufficient number of recommendations are not generated. For example, the additional rules may include recommendations for default packages, such as movie packages, family packages, sports packages, etc.

Figure 3B:
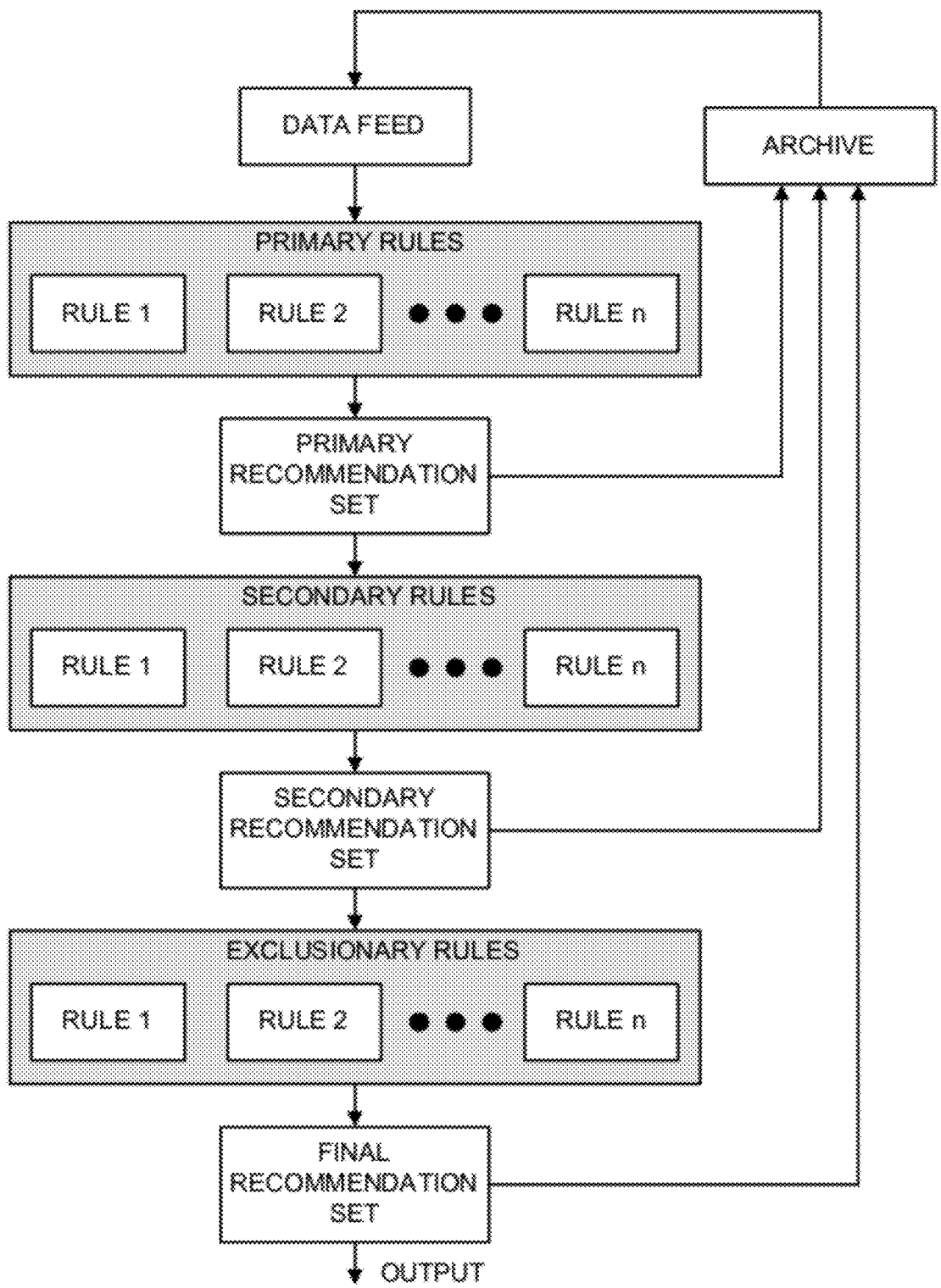
FIG. 3B is a diagram illustrating an exemplary process in which an exemplary embodiment of an AI-based recommender may perform to generate recommendations.

FIG. 3B is a diagram illustrating an exemplary process that AI-based recommender 110 may perform to generate a recommendation. According to other exemplary embodiments, the order of the rules may be different. By way of example, one or more of the exclusionary rules may be applied concurrently with the primary rules and/or the secondary rules.

Referring to FIG. 3B and in accordance with that previously described, AI-based recommender 110 may use various types of data (e.g., data 310) and factors 315 (illustrated as data feed) when applying rules 305. According to an exemplary embodiment, the data feed may include archived data (e.g., past recommendations, etc.). For example, according to an exemplary embodiment, AI-based recommender 110 may archive recommendation data that is generated after applying each of the primary rules, the secondary rules, and the exclusionary rules. In this way, AI-based recommender 110 may learn by using the archived data as a feedback mechanism. For example, AI-based recommender 110 may modify rules 305, factors 315, etc., used for generating recommendations.

As previously described, AI-based recommender 110 may apply a rule set (e.g., primary rules, secondary rules, etc) to recommendation data that is generated after applying a particular set of rules. For example, a primary recommendation set (e.g., recommendation data) may be used by AI-based recommender 110 when applying the secondary rules and a secondary recommendation set may be used by AI-based recommender 110 when applying the exclusionary rules.

Figure 3C:
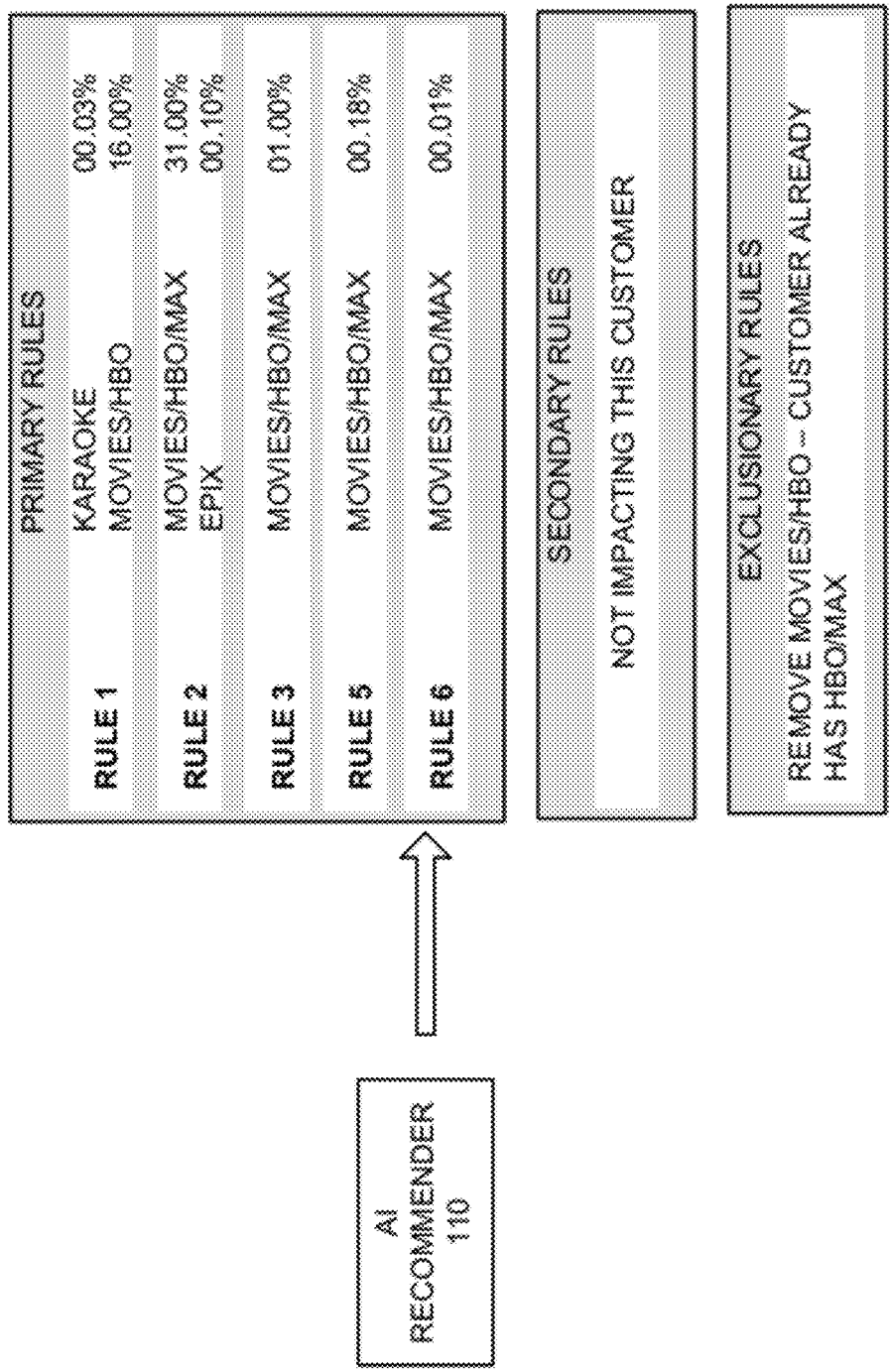
FIGS. 3C-3F are diagrams illustrating exemplary recommendations generated by an exemplary embodiment of an AI-based recommender.
Figure 3D:
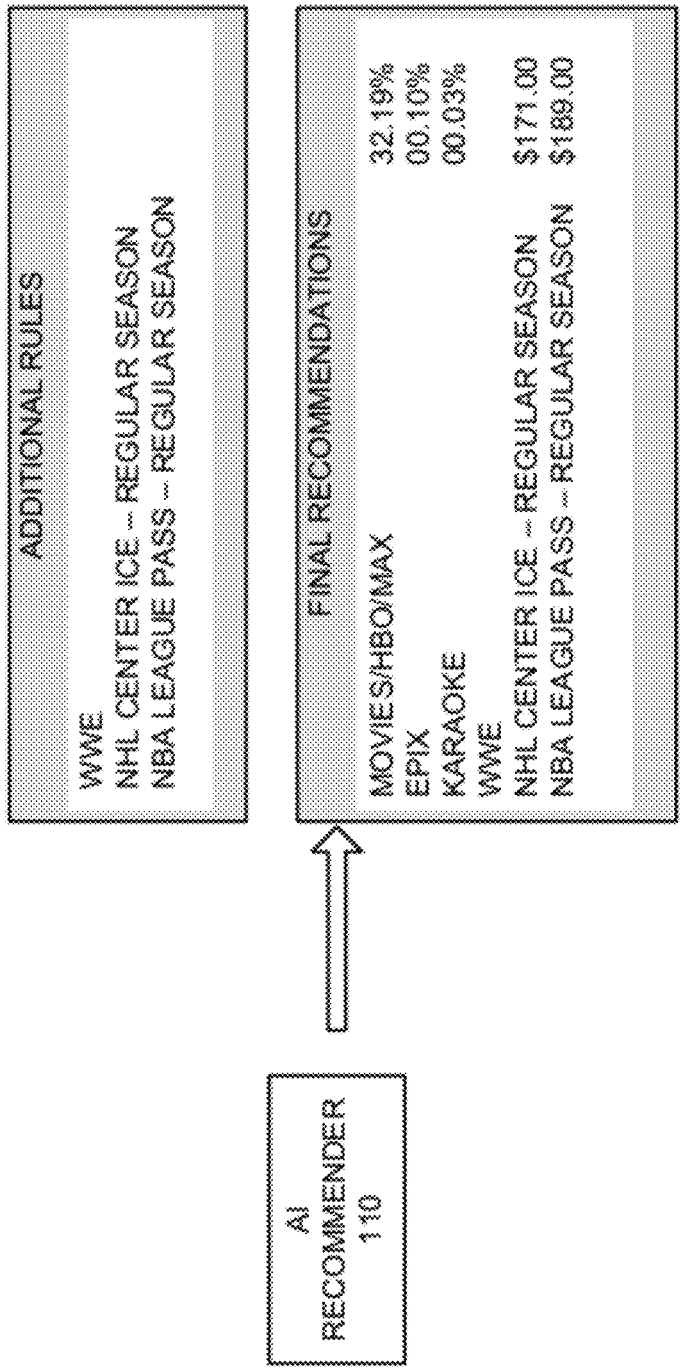

FIGS. 3C-3F are diagrams illustrating exemplary recommendations generated by an exemplary embodiment of AI-based recommender 110. Referring to FIGS. 3C and 3D, in this example, it may be assumed that the customer's current subscription includes HBO and Cinemax. As illustrated in FIG. 3C, after application of the primary rules, AI-based recommender 110 may generate recommendations. For example, based on rule 1, AI-based recommender 110 may recommend a Karaoke package and a Movies/HBO package. In this example, each recommendation includes a particular weight. For example, the Movies/HBO package has a weight of 16.00%. As further illustrated, application of the secondary rules may not impact the recommendations generated from the primary rules. Additionally, the exclusionary rules may cause the recommendation of the Movies/HBO package to be removed since the customer already has HBO and Cinemax.

Referring to FIG. 3D, AI-based recommender 110 may apply additional rules to generate additional recommendations, such as, for example, WWE, NHL Center Ice, and NBA League Pass. AI-based recommender 110 may then generate a final recommendation that includes the Movies/HBO/Cinemax package, Epix, Karaoke, etc.

Figure 3E:
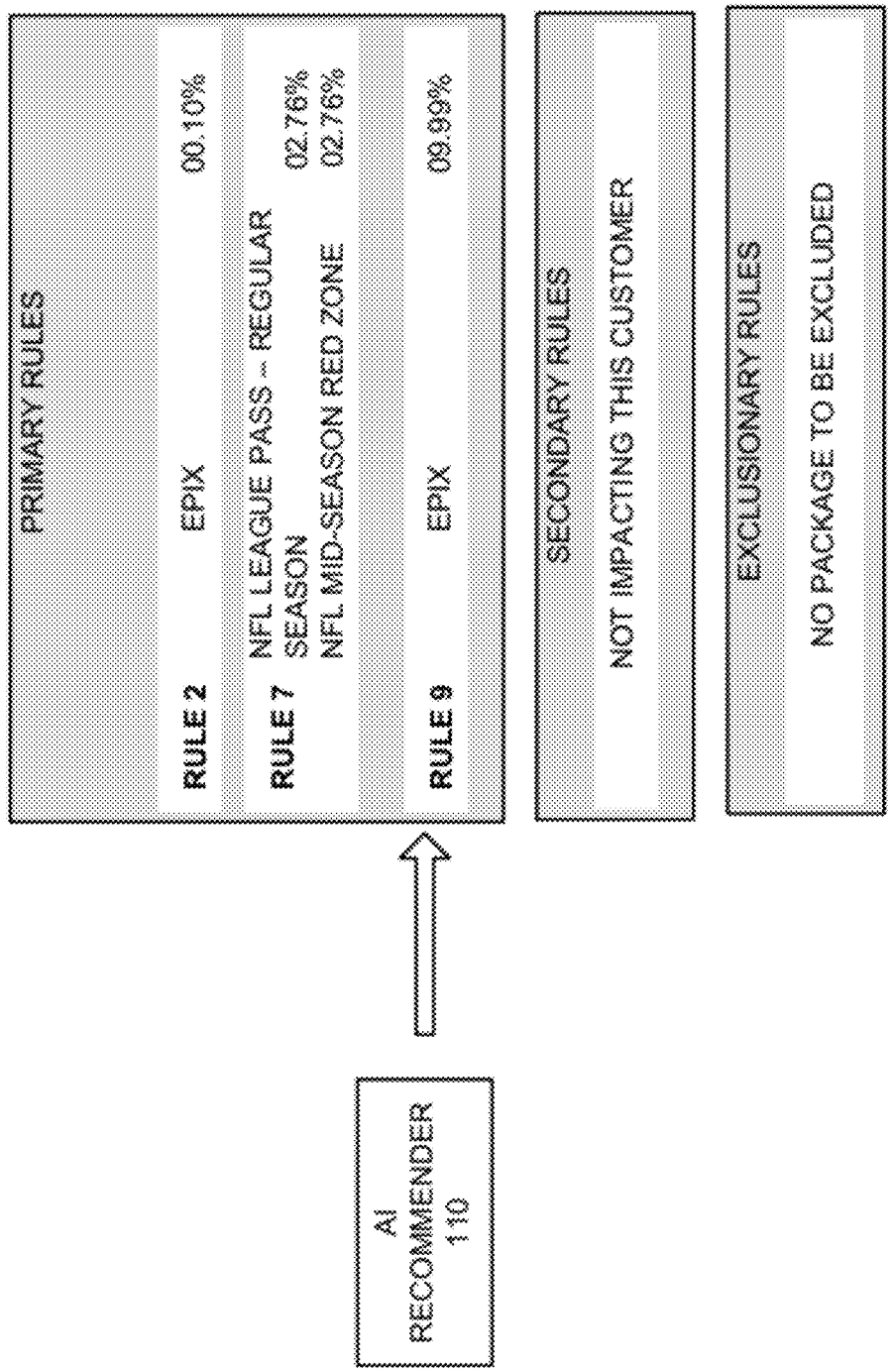
Figure 3F:
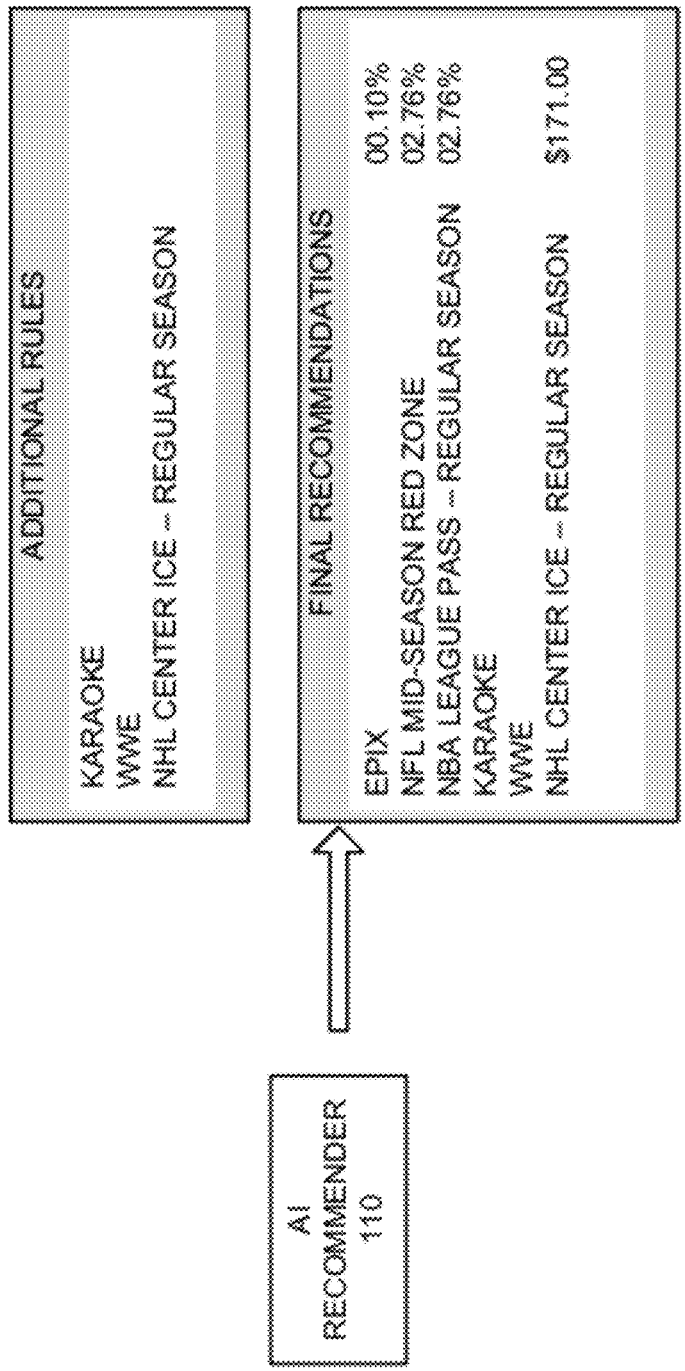

Referring to FIGS. 3E and 3F, in this example, it may be assumed that the customer's current subscription includes the Movie/HBO/Cinemax package. Additionally, the customer's history may include purchasing and dropping NBA League Pass Regular Season for $189.00 and purchasing and dropping NFL Mid-Season Red Zone for $29.00. As illustrated in FIG. 3E, after application of the primary rules, AI-based recommender 110 may generate recommendations. For example, based on rule 2, AI-based recommender 110 may recommend Epix. Additionally, as illustrated, AI-based recommender 110 may recommend other content based on other rules (e.g. rule 7, rule 9, etc.).

As further illustrated, application of the secondary rules and the exclusionary rules may not impact the recommendations generated from the primary rules. Referring to FIG. 3F, AI-based recommender 110 may apply additional rules to generate additional recommendations, such as, for example, Karaoke, WWE, and NHL Center Ice. AI-based recommender 110 may generate a final recommendation that includes Epix, NFL Mid-Season Red Zone, etc.

As previously described, according to an exemplary embodiment, AI-based recommender 110 may provide the recommendations to self-provisioner 115. Self provisioner 115 may generate a user interface that is customer-specific and in correspondence to the recommendations. Additionally, self-provisioner 115 may allow the customer to self-provision (e.g., subscribe to, purchase, etc.) the recommendations presented.

As previously described, according to an exemplary embodiment, self-provisioner 115 may generate a customer-specific, user interface to present the recommendations to the customer. For example, the user interface may correspond to a GUI that provides the customer with the recommendations and allows the customer to select a recommendation. According to other embodiments, the user interface may be different. For example, depending on the type of service the customer has with the service provider (e.g., telephone, Internet, television, etc.), the recommendations may be presented to the customer aurally, etc.

Figure 4:
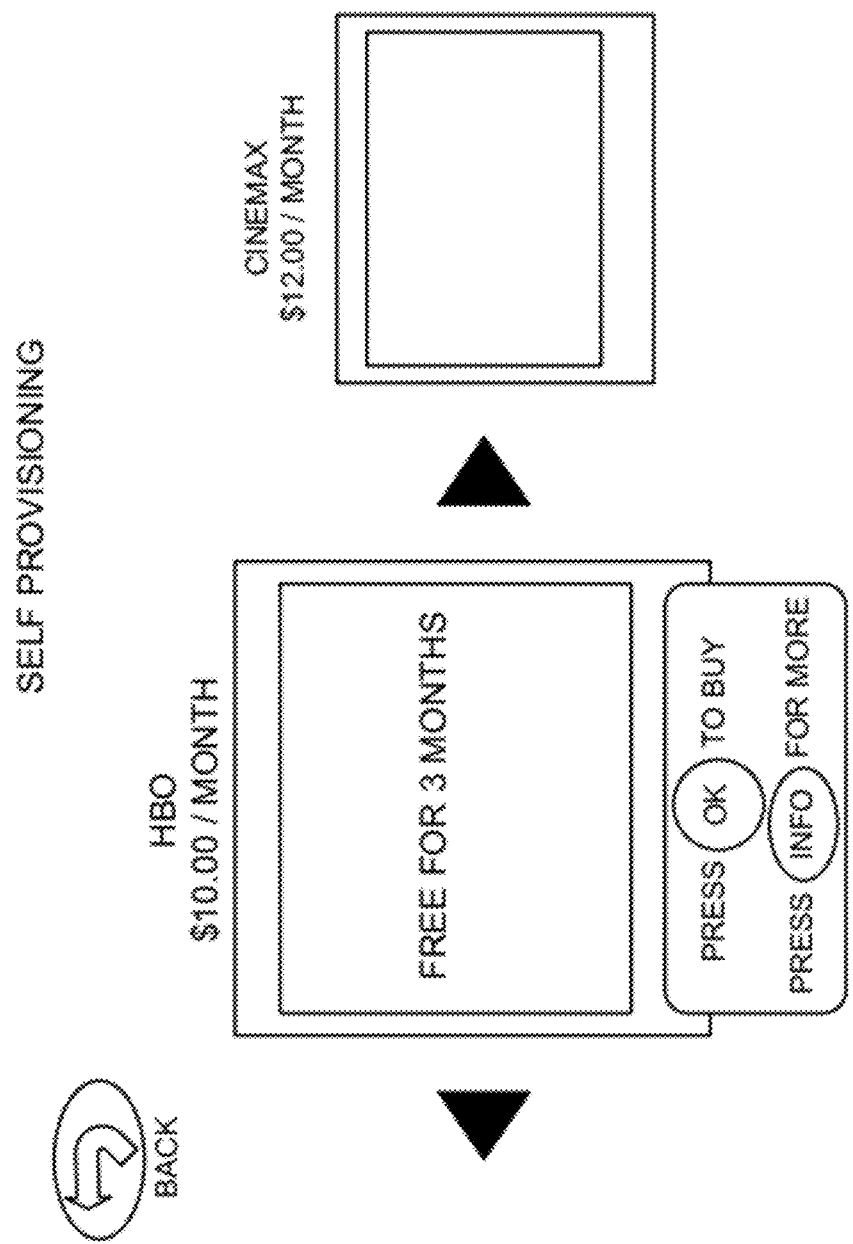
FIG. 4 is a diagram illustrating an exemplary user interface that may be generated by an exemplary embodiment of the self-provisioner to provide recommendations to a customer.

According to an exemplary embodiment, self-provisioner 115 may generate the user interface based on an order of likelihood that the customer may select the recommendation. For example, when AI-based recommender 110 generates multiple recommendations and provides them to self-provisioner 115, AI-based recommender 110 may provide the recommendations in an order corresponding to a likelihood that the customer may select a recommendation (e.g., in a list, etc.). Based on the order of the recommendations, self-provisioner 115 may generate the customer-specific user interface. By way of example, when the user interface corresponds to a GUI, self-provisioner 115 may select a GUI (e.g., from a database, etc.) that corresponds to a recommendation. Self-provisioner 115 may continue this process and generate a GUI that corresponds to an order of the recommendations. For example, as illustrated in FIG. 4, self-provisioner 115 may generate and present to a customer a GUI that offers the recommendations to the customer, and the customer may navigate through the GUI and select a desired recommendation.

According to an exemplary embodiment, when a customer selects a recommendation (e.g., to purchase, to subscribe, etc.), self-provisioner 115 may process the customer's response. For example, self-provisioner 115 may provision the customer's request or forward the customer's request to a provisioning system.

While it has been described that AI-based recommender 110 may use data 310 and/or factors 315 to generate recommendations and/or weights associated with the recommendations, according to an exemplary embodiment, self-provisioner 115 may modify an order of the recommendations based on data 310 and/or factors 315. By way of example, self-provisioner 115 may modify the order of recommendations based on pricing of each recommendation, and/or some other factor. For example, self-provisioner 115 may re-order the recommendations from lowest price to highest price. According to other embodiments, as previously described, self-provisioner 115 may not modify the order of the recommendations or the weights associated with the recommendations.

Figure 5A:
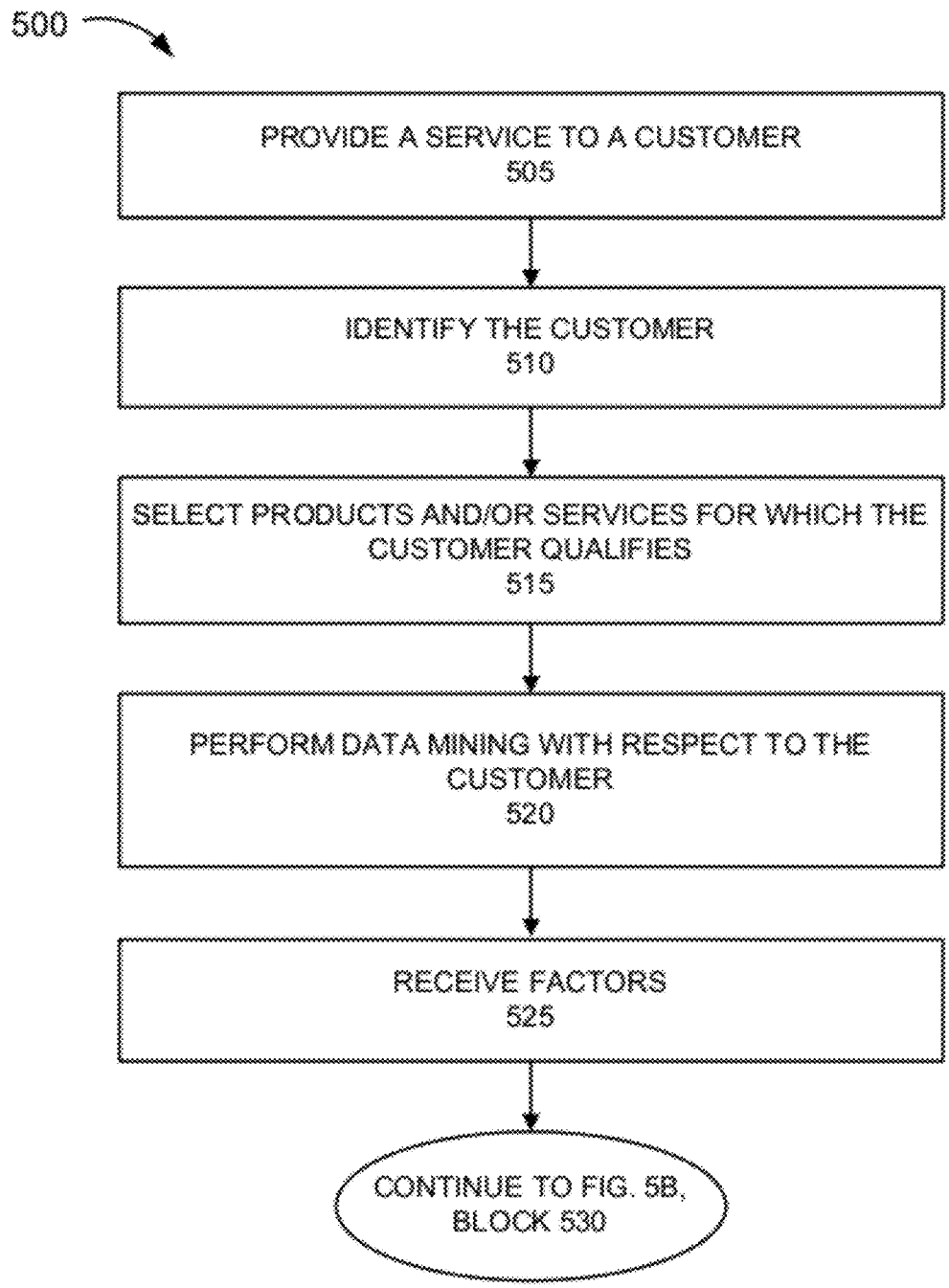
FIGS. 5A and 5B are flow diagrams illustrating an exemplary process associated with an exemplary embodiment of AI-based recommender and an exemplary embodiment of self-provisioner.
Figure 5B:
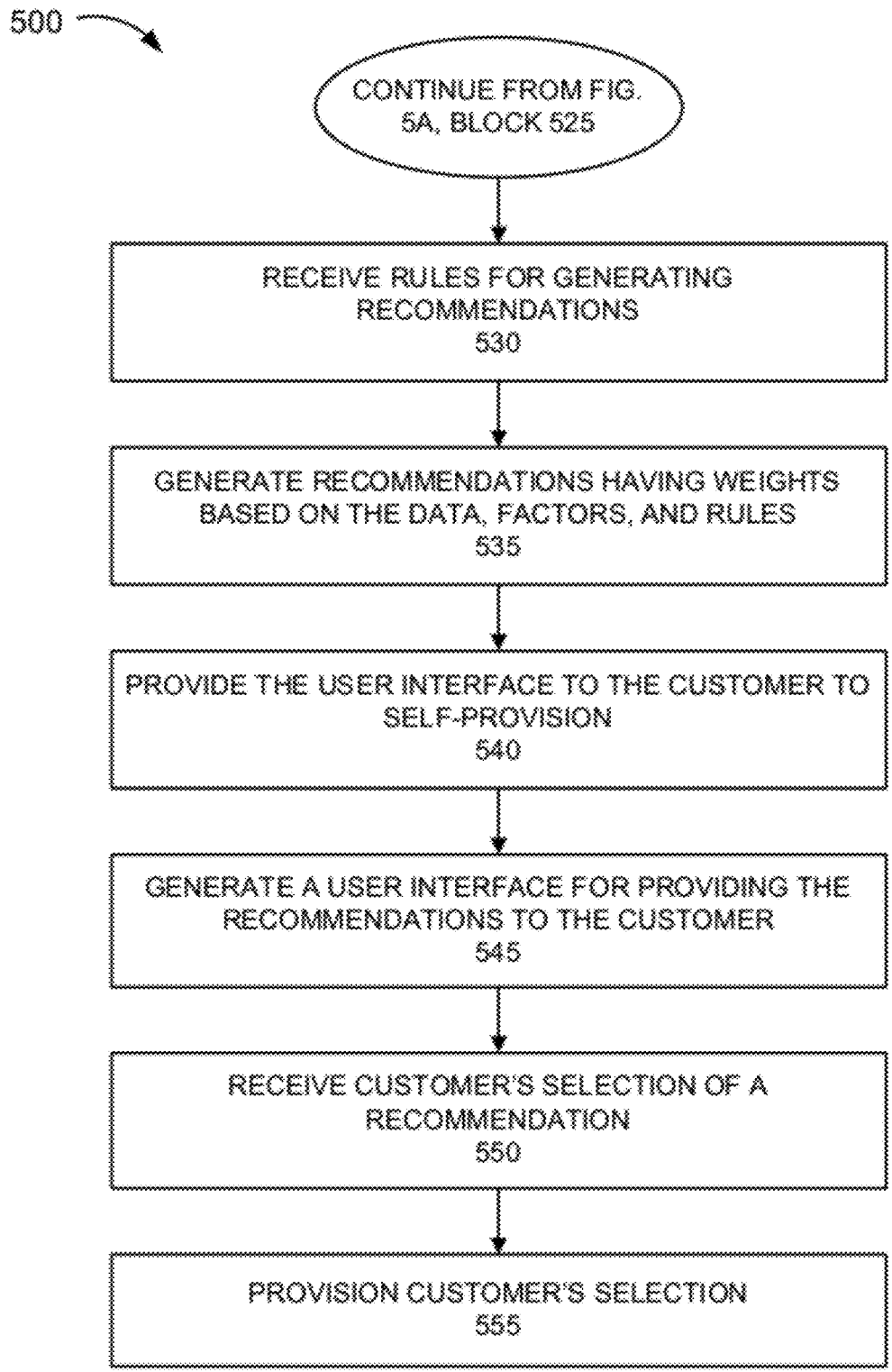

FIGS. 5A and 5B are flow diagrams illustrating an exemplary process associated with exemplary embodiments of customer identifier 120, AI-based recommender 110, and self-provisioner 115.

Referring to FIG. 5A, process 500 may include providing a service to a customer (block 505). For example, as previously described, a service provider may provide one or more services to a customer. For example, SPN 105 may provide various services (e.g., television, Internet access, phone, etc.) to a customer.

A customer may be identified (block 510). For example, as previously described, a customer may be identified automatically or based on manual input from the customer depending on which service is being used, how the service is accessed, etc. As an example, if the customer accesses a customer service portal on the Internet, the customer may manually log-in to access his/her account. Alternatively, when the customer uses his/her user device 170, a telephone number or an equipment identifier may permit customer identifier 120 to identify the customer. Alternatively, when the customer uses his/her desktop computer to access the Internet via SPN Internet interface device 175, a device identifier of the SPN Internet interface device may be obtained to identify the customer. Alternatively, when the customer uses his/her SPN TV interface device 160, a device identifier of the SPN TV interface device 160 may be obtained to identify the customer. Customer identifier 120 may identify the customer based on the device identifier.

Products and/or services may be selected for which the customer qualifies (block 515). For example, as previously described, customer identifier 120 may select products and/or services for which the identifier customer qualifies. For example, customer identifier 120 may determine the products, services, etc., associated with the identified customer by accessing a customer profile database. Customer identifier 120 may also determine products, services, etc., that may be offered by the SP or associated with a particular marketing campaign. Based on a comparison between products, services, etc., currently associated with the customer and those available, customer identifier 120 may select products, services, etc., for which the customer qualifies. As an example, a particular marketing campaign may include up-selling premier movie channels or high-definition set top boxes with digital video recorder (DVR) services. Customer identifier 120 may provide a list of products and/or services for which the customer qualifies, as well as information that identifies the customer.

Data mining with respect to a customer may be performed (block 520). For example, as previously described, AI-based recommender 110 or some other system may perform data mining, knowledge discovery, etc. to create a repository of data (e.g., data 310) to be used by AI-recommender 110 to generate recommendations. For example, the data may pertain to the customer, other customers, etc.

Factors may be received (block 525). For example, AI-based recommender 110 may receive one or more factors (e.g., factors 315) to be used when generating recommendations and/or weights associated with the recommendations. For example, network administrators may provide AI-based recommender 110 with the one or more factors.

Referring to FIG. 5B, rules for generating recommendations may be received (block 530). For example, AI-based recommender 110 may receive rules (e.g., rules 305) to be used when generating recommendations and/or weights associated with the recommendations. For example, network administrators may provide AI-based recommender 110 with the rules.

Recommendations having weights may be generated based on the data, factors, and the rules (block 535). For example, as previously described, AI-recommender 110 may generate recommendations based on data 310, factors 315, and/or rules 305. Additionally, for example, as previously described, AI-recommender 110 may generate weights for the recommendations.

A user interface for presenting the recommendations to the customer may be generated (block 540). For example, as previously described, self-provisioner 110 may generate a user interface for providing the recommendations to the customer(s).

The user interface may be provided to the customer to self-provision (block 545). For example, as previously described, self-provisioner 110 may provide the user interface to the customer(s) via a service (e.g., phone service, Internet access service, television service).

A customer's selection of a recommendation may be received (block 550). For example, as previously described, self-provisioner 110 may receive a customer's selections of a recommendation.

The customer's selection may be provisioned (block 555). For example, as previously described, self-provisioner 110 may provision the customer's selection or send the customer's selection to another provisioning system.

Although FIGS. 5A and 5B illustrate an exemplary process 500 for generating customer-specific recommendations and self-provisioning of those recommendations, according to other embodiments, process 500 may include additional operations, fewer operations, and/or different operations than those illustrated in FIGS. 5A and 5B and described herein. Additionally, while process 500 is described with reference to exemplary devices (e.g., customer identifier 120, AI-based recommender 110, and self-provisioner 115), according to other embodiments, block(s) described in process 500 may be performed by a device or combination of devices other than those specifically mentioned.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processing system 205, etc.), a combination of hardware and software (e.g., application 215), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the present application should be construed as critical or essential to the embodiments described herein unless explicitly described as such.

What is claimed is:
1. A method comprising:
providing at least one of a phone service, an Internet access service, or a television service to customers;
identifying a customer, based on a device identifier, when the customer uses the at least one of the phone service, the Internet access service, or the television service;
determining at least one of a product or a service to which the customer is subscribed based on the identifying;
qualifying the customer, based on the determining, for at least one of another product or another service to recommend pertaining to the least one of the phone service, the Internet access service, or the television service;

selecting the at least one of the other product or the other service to recommend for which the customer qualifies based on the qualifying;
gathering customer-specific data of the customer;
receiving rules that include criteria for generating recommendations on behalf of the customer;
generating, by a device, recommendations that pertain to the at least one of the phone service, the Internet access service, or the television service for the customer based on the at least one of the other product or the other service for which the customer qualifies, the customer-specific data, the rules, and other factors, wherein the other factors include a location of the customer;
assigning a weight, which corresponds to a likelihood of the customer selecting a recommendation, to each of the recommendations;
sorting the recommendations in an order based on the weights assigned to the recommendations, wherein the rules include a first rule to adjust the weight based on a duration between a last purchase date of the customer and a recommendation date, a second rule to adjust the weight based on whether the customer has ever used a product or a service included in the recommendation, and a third rule to adjust a weight of the recommendation that corresponds to a regional package; and
providing the recommendations to the customer via the at least one of the phone service, the Internet access service, or the television service.

2. The method of claim 1, further comprising:
receiving a selection of a recommendation from the customer; and
provisioning the at least one service based on the selection of the recommendation, and wherein the rules include a rule pertaining to an affinity of the customer having a product or a service to purchase another product or another service, a rule that includes an affinity of the customer purchasing a portion of a multi-package combination when the customer already is subscribed to another portion of the multi-package combination, and a rule pertaining to a purchase and a cancellation history.

3. The method of claim 1, further comprising:
archiving the recommendations; and
modifying one or more of the rules based on the archived recommendations.

4. The method of claim 1, wherein the providing comprises:
generating a customer-specific user interface that allows the customer to select from the recommendations; and
providing the recommendations in the order that is from the most likely to the least likely that the customer will select a particular recommendation, wherein the other factors include a time of a year, current events, a state of an economy, a sale history pertaining to a recommendation, and a release of a new service or a new product.

5. The method of claim 1, wherein the rules include a rule pertaining to an association of packages with respect to one or multiple factors for customers that have at least one package, a rule pertaining to a current package of the customer and all combination of packages that can be offered to the customer, and a rule pertaining to an association of packages with respect to one or multiple factors for customers with no packages.

6. The method of claim 1, wherein when the recommendations pertain to the television service in which television content is being recommended, the rules include whether the customer has previously viewed a particular television package being recommended, wherein the customer-specific data includes data pertaining to service usage, purchasing history, cancellation history, changes of service, content searches, type of equipment used by the customer, type of service used by the customer, and calls to customer service.

7. The method of claim 1, wherein the location of the customer corresponds to a ZIP code associated with the customer, and wherein the rules include a set of rules directed towards eliminating one or more recommendations, wherein the set of rules include a rule pertaining to a content filtering associated with the customer, a rule pertaining to previous offers directed towards the customer that were unsuccessful, and a rule that excludes a recommendation because of a current service used by the customer.

8. The method of claim 1, wherein the selecting further comprises:
accessing customer profile information based on the identifying;
determining products used by the customer or services subscribed to by the customer based on the accessing;
determining products or services associated with a marketing campaign;
comparing the products or the services based on the accessing with the products or the services associated with the marketing campaign; and
selecting products or services for which the customer qualifies, wherein the rules include a rule to select a default product or a default service when an insufficient number of recommendations is generated.

9. A device comprising logic configured to:
a communication interface;
a memory, wherein the memory stores instructions;
a processor, wherein the processor executes the instructions to:
obtain customer-specific data for customers receiving at least one of phone service, Internet access service, or television service;
determine at least one of a product or a service to which a customer is subscribed based on the customer-specific data
obtain a list of products or services to which the customer is not subscribed;
qualify the customer for at least one of a product or a service to recommend pertaining to the least one of the phone service, the Internet access service, or the television service in response to a determination of the least one of the product or the service to which the customer is subscribed and the list of products or services to which the customer is not subscribed;
obtain rules that include criteria for selecting recommendations that pertain to the at least one of the phone service, the Internet access service, or the television service;
generate recommendations that pertain to the at least one of the phone service, the Internet access service, or the television service for the customer based on the customer-specific data, the rules, the at least one of the product or the service for which the customer qualifies, and other factors, wherein the other factors include a location of the customer in which the customer receives the least one of the phone service, the Internet access service, or the television service;
assign a weight, which corresponds to a likelihood of the customer selecting a recommendation, to each of the recommendations; and
sort the recommendations in an order based on the weights assigned to the recommendations, wherein the rules include a first rule to adjust the weight based on a duration between a last purchase date of the customer and a recommendation date, a second rule to adjust the weight based on whether the customer has ever used a product or a service included in the recommendation, and a third rule to adjust a weight of the recommendation that corresponds to a regional package.

10. The device of claim 9, wherein the other factors include a time in which the recommendations are being provided to the customer, a state of the economy, current events, a sale history pertaining to a recommendation, and a release of a new service or a new product.

11. The device of claim 9, wherein the processor further executes the instructions to:
  archive the recommendations; and
  modify one or more of the rules based on the archived recommendations.

12. The device of claim 11, wherein the processor further executes the instructions to:
  increase the weight or decrease the weight based on a measurement of success of the recommendation with other customers.

13. The device of claim 9, wherein the rules include criteria pertaining to customer migration history, customer affinity to a recommendation based on customer's current subscription, and customer usage.

14. The device of claim 9, wherein the recommendations pertain to a television content package or a television content bundle associated with sports or movies, wherein the customer-specific data includes data pertaining to service usage, purchasing history, cancellation history, changes of service, content searches, type of equipment used by the customer, type of service used by the customer, and calls to customer service.

15. The device of claim 14, wherein the rules include criteria pertaining to one or more of a time period between a last purchase date and a recommendation date or whether the customer has previously viewed the television content package or the television content bundle.

16. The device of claim 9, wherein the processor further executes the instructions to:
  generate the recommendations on a customer basis or a customer device-level basis, wherein the rules include a rule pertaining to an association of packages with respect to one or multiple factors for customers that have at least one package, a rule pertaining to a current package of the customer and all combination of packages that can be offered to the customer, and a rule pertaining to an association of packages with respect to one or multiple factors for customers with no packages.

17. A method comprising:
  identifying a customer when the customer uses a television service;
  selecting at least one of another product or another service to recommend to the customer;
  gathering customer-specific data of the customer;
  receiving rules that include criteria for generating recommendations on behalf of the customer;
  generating, by a device, recommendations that pertain to the television service based on the at least one of the other product or the other service, the customer-specific data, and the rules,
  assigning a weight, which corresponds to a likelihood of the customer selecting a recommendation, to each of the recommendations;
  sorting the recommendations in an order based on the weights assigned to the recommendations, wherein the rules include a first rule to adjust the weight based on a duration between a last purchase date of the customer and a recommendation date, a second rule to adjust the weight based on whether the customer has ever used a product or a service included in the recommendation, and a third rule to adjust a weight of the recommendation that corresponds to a regional package; and
  providing the recommendations to the customer via the television service.

18. The method of claim 17, further comprising:
  receiving a selection of a recommendation from the customer; and
  provisioning the at least one service based on the selection of the recommendation.

19. The method of claim 17, wherein the providing comprises:
  generating a customer-specific user interface that allows the customer to select from the recommendations; and
  providing the recommendations in the order that is from the most likely to the least likely that the customer will select a particular recommendation.

20. The method of claim 17, wherein the rules include criteria pertaining to customer migration history, customer affinity to a recommendation based on customer's current subscription, and customer usage.

* * * * *